(12) United States Patent
Slafer

(10) Patent No.: US 10,682,805 B2
(45) Date of Patent: Jun. 16, 2020

(54) FORMATION OF PATTERN REPLICATING TOOLS

(71) Applicant: MicroContinuum, Inc., Cambridge, MA (US)

(72) Inventor: W. Dennis Slafer, Arlington, MA (US)

(73) Assignee: MicroContinuum, Inc., Cambridge, MA (US)

( * ) Notice: Subject to any disclaimer, the term of this patent is extended or adjusted under 35 U.S.C. 154(b) by 818 days.

(21) Appl. No.: 14/720,193

(22) Filed: May 22, 2015

(65) Prior Publication Data

US 2015/0336327 A1    Nov. 26, 2015

Related U.S. Application Data

(62) Division of application No. 11/711,928, filed on Feb. 27, 2007, now Pat. No. 9,039,401.

(60) Provisional application No. 60/777,203, filed on Feb. 27, 2006, provisional application No. 60/777,138, filed on Feb. 27, 2006.

(51) Int. Cl.
| | |
|---|---|
| *B29C 59/00* | (2006.01) |
| *B29C 59/02* | (2006.01) |
| *B29C 33/58* | (2006.01) |
| *B29C 33/38* | (2006.01) |

(Continued)

(52) U.S. Cl.
CPC ............ *B29C 59/022* (2013.01); *B29C 33/30* (2013.01); *B29C 33/38* (2013.01); *B29C 33/3857* (2013.01); *B29C 33/58* (2013.01); *B29C 33/3878* (2013.01); *B29C 33/424* (2013.01);

(Continued)

(58) Field of Classification Search
CPC ... B29C 33/30; B29C 33/307; B29C 33/3857; B29C 33/3878; B29C 33/3885; B29C 33/3892; B29C 33/42; B29C 33/424
See application file for complete search history.

(56) References Cited

U.S. PATENT DOCUMENTS 2,706,175 A    4/1955  Licharz
3,551,235 A    12/1970 Bassemir et al.
(Continued)

FOREIGN PATENT DOCUMENTS

| CA | 2504369 | 4/2003 |
|---|---|---|
| DE | 2708039 | 4/1979 |

(Continued)

OTHER PUBLICATIONS

International Search Report and the Written Opinion from corresponding PCT Application No. PCT/US07/05151 dated Dec. 17, 2007.

(Continued)

*Primary Examiner* — Timothy Kennedy
(74) *Attorney, Agent, or Firm* — Cesari and McKenna, LLP

(57) ABSTRACT

Systems, methods, and apparatus are disclosed for making patterning tools from one or more discrete elements. Such tools can have one or more "seams" or joints where the individual elements abut which can limit the tools' performance and utility in roll-to-roll manufacturing. Methods are described herein for producing "near-seamless" tools, that is, tools having seams that exhibit minimum disruption of the tool pattern and thus improved material produced by such tools. The patterning tools can be cylindrical and/or closed in shape.

32 Claims, 20 Drawing Sheets

(51) Int. Cl.
*B29C 33/30* (2006.01)
*B29C 33/42* (2006.01)

(52) U.S. Cl.
CPC ..... *B29C 2059/023* (2013.01); *Y10T 156/108* (2015.01)

(56) References Cited

U.S. PATENT DOCUMENTS

| | | | |
|---|---|---|---|
| 3,617,351 A | 11/1971 | Long et al. | |
| 3,636,147 A | 1/1972 | Rowland et al. | |
| 3,926,402 A | 12/1975 | Heenan | |
| 4,042,654 A | 8/1977 | Leszyk et al. | |
| 4,049,413 A | 9/1977 | French | |
| 4,058,430 A | 11/1977 | Suntola et al. | |
| 4,102,756 A | 7/1978 | Castellani et al. | |
| 4,125,447 A | 11/1978 | Bachert | |
| 4,181,217 A | 1/1980 | Huls et al. | |
| 4,211,743 A | 7/1980 | Nauta et al. | |
| 4,286,860 A | 9/1981 | Gursky et al. | |
| 4,294,782 A | 10/1981 | Froehlig | |
| 4,309,455 A | 1/1982 | Miyagawa | |
| 4,362,806 A | 12/1982 | Whitmore | |
| 4,366,235 A | 12/1982 | Land | |
| 4,372,829 A | 2/1983 | Cox | |
| 4,386,145 A | 5/1983 | Gilmour | |
| 4,389,973 A | 6/1983 | Suntola | |
| 4,426,311 A | 1/1984 | Vander Mey | |
| 4,428,761 A | 1/1984 | Howard et al. | |
| 4,478,769 A | 10/1984 | Procone et al. | |
| 4,486,363 A | 12/1984 | Pricone et al. | |
| 4,514,345 A | 4/1985 | Johnson et al. | |
| 4,663,274 A | 5/1987 | Slafer et al. | |
| 4,702,792 A | 10/1987 | Chow | |
| 4,790,893 A | 12/1988 | Watkins | |
| 4,836,874 A | 6/1989 | Foster | |
| 4,860,023 A | 8/1989 | Halm | |
| 4,871,623 A | 10/1989 | Hoopman et al. | |
| 4,923,572 A | 5/1990 | Watkins et al. | |
| 5,075,796 A | 12/1991 | Schildkraut et al. | |
| 5,077,181 A | 12/1991 | Pan et al. | |
| 5,096,401 A | 3/1992 | Tamura et al. | |
| 5,147,763 A | 9/1992 | Kamitakahara | |
| 5,281,371 A | 1/1994 | Tamura et al. | |
| 5,284,548 A | 2/1994 | Carey | |
| 5,327,825 A * | 7/1994 | Parker | B29C 59/002 264/219 |
| 5,330,880 A | 7/1994 | Horigome et al. | |
| 5,358,283 A | 10/1994 | Silva | |
| 5,408,308 A | 4/1995 | Allegretto et al. | |
| 5,475,660 A | 12/1995 | Shikichi | |
| 5,480,596 A | 1/1996 | Okubo et al. | |
| 5,496,463 A | 3/1996 | Mori et al. | |
| 5,505,564 A | 3/1996 | Ledger | |
| 5,517,338 A | 5/1996 | Vaughn et al. | |
| 5,521,030 A | 5/1996 | McGrew | |
| 5,524,342 A | 6/1996 | Swain et al. | |
| 5,575,961 A | 11/1996 | Kuwabara et al. | |
| 5,620,712 A | 4/1997 | Nishino et al. | |
| 5,620,769 A | 4/1997 | Wessels et al. | |
| 5,627,817 A | 5/1997 | Rosen et al. | |
| 5,635,114 A | 6/1997 | Hong | |
| 5,639,404 A | 6/1997 | Meier-Kaiser et al. | |
| 5,759,455 A | 6/1998 | Kamitakahara et al. | |
| 5,759,466 A | 6/1998 | Onuma et al. | |
| 5,872,758 A | 2/1999 | Put et al. | |
| 5,874,363 A | 2/1999 | Hoh et al. | |
| 5,879,855 A | 3/1999 | Schadeli et al. | |
| 5,906,912 A | 5/1999 | Watanabe et al. | |
| 5,948,488 A | 9/1999 | Marecki et al. | |
| 6,015,599 A | 1/2000 | Keller et al. | |
| 6,017,657 A | 1/2000 | Mentz et al. | |
| 6,018,383 A | 1/2000 | Dunn et al. | |
| 6,045,980 A | 4/2000 | Edelkind et al. | |
| 6,106,627 A | 8/2000 | Yializis | |
| 6,113,769 A | 9/2000 | Uzoh et al. | |
| 6,162,519 A | 12/2000 | Takakuwa et al. | |
| 6,163,523 A | 12/2000 | Drecoll | |
| 6,183,610 B1 | 2/2001 | Kataoka et al. | |
| 6,222,157 B1 | 4/2001 | Langille et al. | |
| 6,241,228 B1 | 6/2001 | Chupick | |
| 6,258,251 B1 | 7/2001 | Gowans et al. | |
| 6,309,799 B1 | 10/2001 | Rueckl | |
| 6,337,105 B1 | 1/2002 | Kunieda et al. | |
| 6,350,664 B1 | 2/2002 | Haji et al. | |
| 6,375,870 B1 | 4/2002 | Visovsky et al. | |
| 6,395,136 B1 | 5/2002 | Andersson et al. | |
| 6,420,100 B1 | 7/2002 | Trokhan et al. | |
| 6,440,333 B2 | 8/2002 | Masuhara | |
| 6,482,742 B1 | 11/2002 | Chou | |
| 6,540,367 B1 | 4/2003 | Benson et al. | |
| 6,551,410 B2 | 4/2003 | Crevasse et al. | |
| 6,554,601 B2 | 4/2003 | Ampulski et al. | |
| 6,568,931 B2 | 5/2003 | Fujii et al. | |
| 6,696,220 B2 | 2/2004 | Bailey et al. | |
| 6,703,095 B2 | 3/2004 | Busshoff et al. | |
| 6,753,067 B2 | 6/2004 | Chen et al. | |
| 6,788,452 B2 | 9/2004 | Liang et al. | |
| 6,790,377 B1 | 9/2004 | Cohen | |
| 6,833,177 B2 | 12/2004 | Chen et al. | |
| 6,861,365 B2 | 3/2005 | Taussig et al. | |
| 6,873,452 B2 | 3/2005 | Tseng et al. | |
| 6,875,384 B1 | 4/2005 | Whitney | |
| 6,849,308 B1 | 5/2005 | Speakman | |
| 6,906,779 B2 | 6/2005 | Chan-Park et al. | |
| 6,933,098 B2 | 8/2005 | Chan-Park et al. | |
| 6,972,893 B2 | 12/2005 | Chen et al. | |
| 7,005,468 B2 | 2/2006 | Zang et al. | |
| 7,109,118 B2 | 9/2006 | Cohen | |
| 7,132,158 B2 | 11/2006 | Brenneman et al. | |
| 7,144,942 B2 | 12/2006 | Zang et al. | |
| 7,154,451 B1 | 12/2006 | Sievenpiper | |
| 7,190,315 B2 | 3/2007 | Waltho | |
| 7,195,950 B2 | 3/2007 | Taussig et al. | |
| 7,261,950 B2 | 8/2007 | Fleming et al. | |
| 7,309,222 B2 | 12/2007 | Tippmann, Sr. | |
| 7,470,544 B2 | 12/2008 | Sharma | |
| 7,674,103 B2 | 3/2010 | Slafer | |
| 7,811,669 B2 | 10/2010 | Fujii | |
| 7,833,389 B1 | 11/2010 | Slafer | |
| 8,263,433 B2 | 9/2012 | Yeh et al. | |
| 8,435,373 B2 | 5/2013 | Slafer | |
| 8,535,041 B2 | 9/2013 | Slafer | |
| 8,940,117 B2 | 1/2015 | Slafer | |
| 9,039,401 B2 | 5/2015 | Slafer | |
| 9,307,648 B2 | 4/2016 | Slafer | |
| 9,724,849 B2 | 8/2017 | Slafer | |
| 9,845,912 B2 | 12/2017 | Phillips et al. | |
| 2001/0038072 A1 | 11/2001 | Aumond et al. | |
| 2001/0038900 A1 | 11/2001 | Todori et al. | |
| 2002/0100553 A1 | 8/2002 | Toyoda | |
| 2002/0186472 A1 | 12/2002 | Sloot | |
| 2003/0018710 A1 | 1/2003 | Choi | |
| 2003/0059578 A1 | 3/2003 | Williams et al. | |
| 2003/0227683 A1 | 12/2003 | Sewall et al. | |
| 2004/0005423 A1 | 1/2004 | Dalton et al. | |
| 2004/0075396 A1 | 4/2004 | Okumura et al. | |
| 2004/0131718 A1 | 7/2004 | Chou et al. | |
| 2004/0175528 A1 | 9/2004 | Paulson et al. | |
| 2004/0219246 A1 | 11/2004 | Jeans | |
| 2004/0266207 A1 | 12/2004 | Sirringhauss et al. | |
| 2005/0032375 A1 | 2/2005 | Lockard | |
| 2005/0069480 A1 | 3/2005 | Huang et al. | |
| 2005/0106837 A1 | 5/2005 | Nakai et al. | |
| 2005/0112472 A1 | 5/2005 | Kutsch et al. | |
| 2005/0133954 A1 | 6/2005 | Homola | |
| 2005/0167276 A1 | 8/2005 | Stilli | |
| 2005/0239935 A1 | 10/2005 | Kang et al. | |
| 2005/0274693 A1 | 12/2005 | Heidari et al. | |
| 2006/0134922 A1 | 6/2006 | Taussig et al. | |
| 2006/0198981 A1 | 9/2006 | Murata et al. | |
| 2006/0283539 A1 | 12/2006 | Slafer | |
| 2007/0169336 A1 | 7/2007 | Luch | |
| 2007/0222096 A1 | 9/2007 | Slafer | |
| 2007/0275556 A1 | 11/2007 | Bietsch et al. | |

(56) References Cited

U.S. PATENT DOCUMENTS

| | | | |
|---|---|---|---|
| 2008/0190892 | A1 | 8/2008 | Lee |
| 2008/0230511 | A1 | 9/2008 | Kim |
| 2008/0261478 | A1 | 10/2008 | Cok et al. |
| 2008/0292973 | A1 | 11/2008 | Stamper |
| 2008/0303160 | A1 | 12/2008 | Colburn et al. |
| 2009/0130607 | A1 | 5/2009 | Slafer |
| 2009/0136657 | A1 | 5/2009 | Slafer |
| 2010/0148159 | A1 | 6/2010 | Burgi et al. |
| 2011/0140303 | A1 | 6/2011 | Jang et al. |
| 2011/0262860 | A1 | 10/2011 | Willson |
| 2012/0125880 | A1 | 5/2012 | Slafer |
| 2013/0146117 | A1 | 6/2013 | Brady |
| 2013/0256265 | A1 | 10/2013 | Darling |
| 2014/0110040 | A1 | 4/2014 | Cok |
| 2014/0151935 | A1 | 6/2014 | Slafer |
| 2015/0056816 | A1 | 2/2015 | Sato |
| 2015/0168836 | A1 | 6/2015 | Yamaguchi |
| 2015/0231572 | A1 | 8/2015 | Vankelecom |
| 2015/0372621 | A1 | 12/2015 | Brady |
| 2017/0110688 | A1 | 4/2017 | Slafer |

FOREIGN PATENT DOCUMENTS

| | | |
|---|---|---|
| EP | 0264341 | 4/1988 |
| EP | 0557998 | 9/1993 |
| EP | 0762721 | 3/1997 |
| EP | 0889306 | 1/1999 |
| EP | 1093901 | 4/2001 |
| GB | 2350321 A | 11/2000 |
| JP | 57143484 | 9/1982 |
| JP | 60047846 | 3/1985 |
| KR | 616105 | 8/2006 |
| WO | WO 9906234 | 6/1990 |
| WO | WO 97/14142 | 4/1997 |
| WO | WO 03/095175 | 11/2003 |
| WO | WO 2004/101855 | 11/2004 |
| WO | WO 2005/072242 | 8/2005 |
| WO | WO 2005/072936 | 8/2005 |
| WO | WO 2006/078918 | 7/2006 |

OTHER PUBLICATIONS

Slafer et al., "Continuous Manufacturing of Thin Cover Sheet Optical Media," SPIE Optical Data Storage, 14 pages (1992).

International Search Report and Written Opinion for related PCT Application No. PCT/US08/83407, dated Jan. 12, 2009, 7 pages.

Phiar's Terahertz-Wave interconnect Technology, Phiar Corporation (2003).

International Search Report and Written Opinion from corresponding PCT Application PCT/US07/076708 dated Nov. 3, 2008.

International Search Report and Written Opinion from corresponding PCT Application PCT/US2009/31876 dated Mar. 27, 2009.

Supplementary European Search Report from corresponding EP Application No. 06719038 dated Feb. 12, 2009.

Land, "An Introduction to Polavision" Photographic Science and Engineering, 21:225-236 (1977).

Alleman, Gayle "How DVDs Work" Oct. 25, 2000. Howstuffworks. com http://electronics.howstuffworks.com/dvd.htm.

Supplementary European Search Report for related EP Application No. EP04711734, 2 pps, dated Sep. 12, 2008.

European Search Report from Corresponding EP Application No. 06773532.4 dated Apr. 8, 2011.

James J. Cowan, et al, "The Recording and Replication of Holographic Micropatterns for the Ordering of Photographic Emulsion Grains in Film Systems", J. Imaging Sci. 31, 100-107 (1987).

W.D. Slafer, et al, "Investigation of Arrayed Silver Halide Grains", J. Imaging Sci. 31, 117-125 (1987).

V. Walworth, et al, "Thin Layer Coalescence of Silver Halides", J. Imaging Sci. 31, 108-116 (1987).

Sachin Bet, et al, "Thin film deposition on plastic substrates using silicon nanoparticles and laser nanoforming", Materials Science and Engineering: B, vol. 130, Issues 1-3, Jun. 15, 2006, pp. 228-236.

International Search Report and Written Opinion for Corresponding PCT Application No. PCT/US2007/74766, 10PP. dated May 12, 2008.

Physical and Thermal Properties, Kapton Polyimide Films, http://www2.dupont.com/Kapton/en.sub.--US/;http://www.upilex.jp/e.sub.--index.html (printed from the website on May 5, 2015).

International Search Report dated Jul. 29, 2015 from corresporilang PCT Application No. PCT/US2015/030524.

Kotter et al., "Theory and Manufacturing Processes of Solar Nanoantenna Electromagnetic Collectors," J. Sol. Energy Eng., 132:1-11 (2010).

Berland, "Photovoltaic Technologies Beyond the Horizon: Optical Rectenna Solar Cell," ITN Energy Systems, Final Project Report NREL/SR-520-33263, 21 pages (2003).

Sarehraz et al., "Rectenna Developments for Solar Energy Collection," Conference Record of 31st Photovoltaic Specialists Conference, IEEE, pp. 78-81 (2005).

Chou et al., "Imprint Lithography with 25-Nanometer Resolution," Science, 272:85-87 (1996).

Xia et al., "Soft Lithography," Angew. Chem. Int. Ed., 37:551-575 (1998).

Rogers et al., "Recent Progress in Soft Lithography," Materials Today, 8:50-56 (2005).

Moonen, "Alternative Lithography Strategies for Flexible Electronics," Ph.D. thesis, 183 pages (2012).

Li et al., "Self-Aligned High-Resolution Printed Polymer Transistors," Adv. Mater., 23:4107-4110 (2011).

Palfinger et al., "Fabrication of n-and p-Type Organic Thin Film Transistors with Minimized Gate Overlaps by Self-Aligned Nanoimprinting," Adv. Mater., 22:1-5 (2010).

Dickey et al., "Transistors Formed from a Single Lithography Step Using Information Encoded in Topography,", Small, 18:2050-2057 (2010).

Zeonorfilm, Isotropic Optical Films, Zeon Chemical Ltd, Tokyo Japan (http://www.zeonex.com/) (printed from the website on May 5, 2015).

Physical & Thermal Properties, Mylar Polyester Film, DuPont Teijin Films, 222367D, http://usa.dupontteijinfilms.com/informationcenter/downloads/Phy- sical.sub.--And.sub.--Thermal.sub.--Properties.pdf (2003).

Comparison of Properties, PEN Film, Teijin DuPont Films, http://www.teijindupontfilms.jp/english/product/hi.sub.--film.html (printed from the website on May 5, 2015).

* cited by examiner

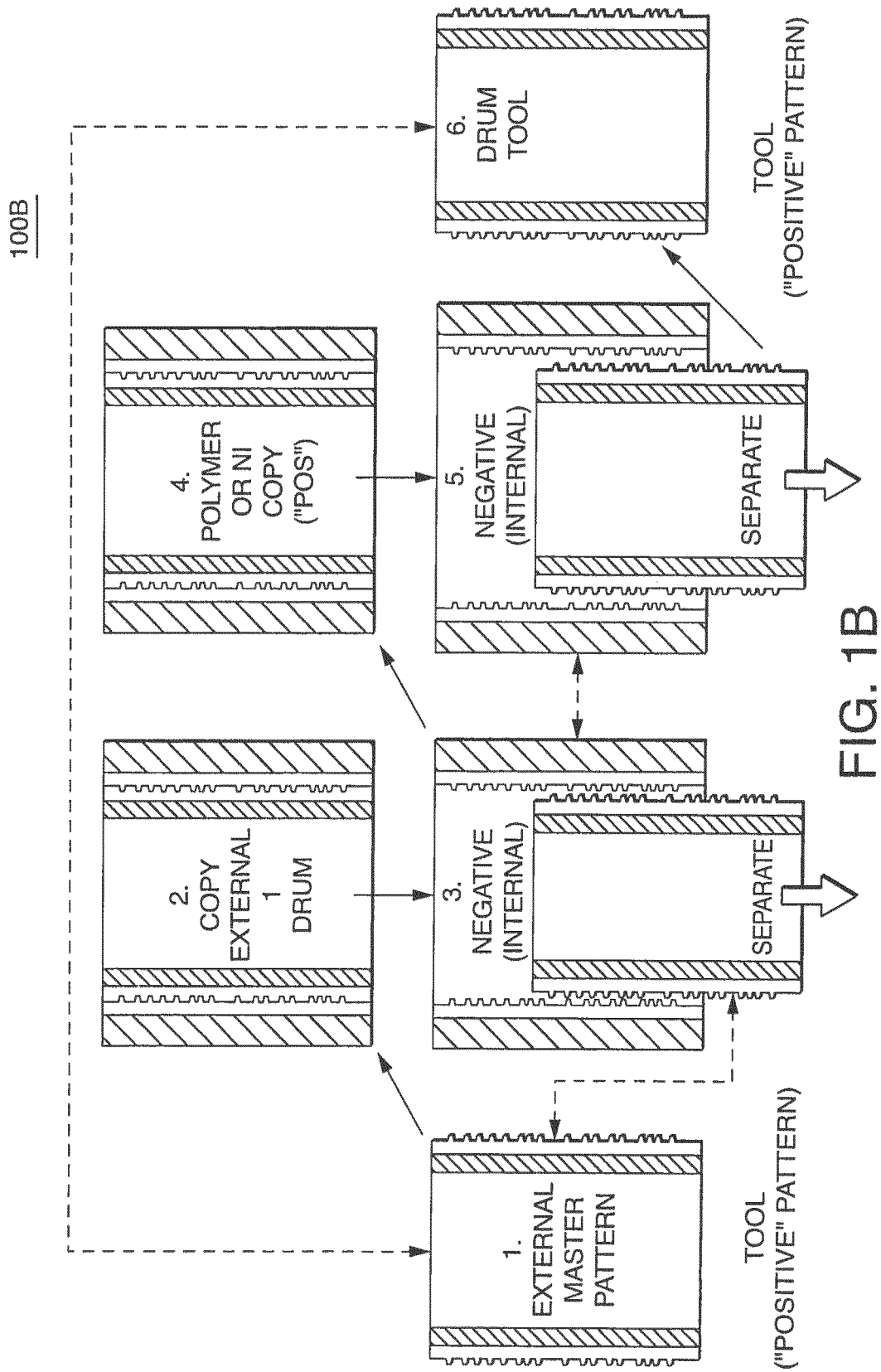

FORMATION OF PATTERN REPLICATING TOOLS

RELATED APPLICATIONS

The present disclosure is a Divisional of U.S. patent application Ser. No. 11/711,928 Feb. 27, 2007, which claims the benefit of U.S. Provisional Application No. 60/777,203, filed 27 Feb. 2006, and U.S. Provisional Application No. 60/777,138 filed 27 Feb. 2006, the contents of all of which applications are incorporated by reference herein in their entireties. The present disclosure also is related to U.S. application Ser. No. 11/509,288, filed 24 Aug. 2006, and U.S. application Ser. No. 11/337,013 filed 20 Jan. 2006, which claims the benefit of U.S. Provisional Application No. 60/645,714 filed 21 Jan. 2005; the contents of all of which applications are incorporated by reference herein in their entireties.

BACKGROUND

A number of technology applications require the creation of precise relief structures having critical dimensions from the multi-micron to the nanometer size regime. Roll-to-roll (R2R) processes for reproducing such structures often utilize a patterning tool in the form of a cylinder or belt, and a number of methods for producing cylindrical tools are well known to the art, particularly in the graphic arts field. Typically such tools comprise one or more discrete pattern elements attached to the outer surface of a support member. See U.S. Pat. Nos. 5,147,763; 6,163,523; 4,836,874; and 4,486,363. Examples of seamed tools used in. R2R optical disc fabrication include those disclosed in W. D. Slafer, M. Kime, and R. Monen, "Continuous Web Manufacturing of Thin-Coverslip Optical Media", SPIE Optical Data Storage '92, San Jose, Calif., 12 Feb. 1992.

The seams that can result from forming patterning tools from discrete elements often represent a limitation in manufacturing processes that utilize such tools. Even in cases in which the pattern to be replicated is already composed of discrete elements (such as discs, cards, display screens, etc,), the seams can effect the production process, such as by causing "speed bumps" at the seam which cause pressure roller bouncing (especially at higher line speeds), trapping of processing fluid in low spots, "tenting" at high spots (resulting in non-contact between the substrate and the tool pattern), etc. Seams can also result in performance and visual limitations in the material being produced by such tools, for example in diffractive optical elements, large-area displays, embossed holographic foils and the like.

Because the creation of cylindrical patterning tools can be expensive and time consuming, particularly when a very precise and/or finely-detailed pattern is involved, it is very desirable to be able to quickly and inexpensively make precise replicas of such tools.

SUMMARY

The present disclosure addresses limitations of the prior art and provide improved systems, methods, and apparatus useful for forming cylindrical patterning tools from one or more discrete pattern-containing parts that are suitable for use in roll-to-roll manufacturing. Such tools are used for the replication of relief patterns in such areas as flexible electronics, holography, micro/nanostructure fabrication, micro/nanoprinting, and data storage, to name a few. The shapes of the patterning tools can be cylindrical and/or continuous, such as a belt, cylinder, and/or drum configuration.

BRIEF DESCRIPTION OF FIGURES

Aspects of the present disclosure may be more fully understood from the following description when read together with the accompanying drawings, which are to be regarded as illustrative in nature, and not as limiting. The drawings are not necessarily to scale, emphasis instead being placed on the principles of the disclosure. In the drawings:

FIG. 1B depicts a schematic view of apparatus and related process flow for drum formation and replication showing interconversion between internal and external patterns, where the process can begin with external master pattern or internal master pattern;

Figure 1A:
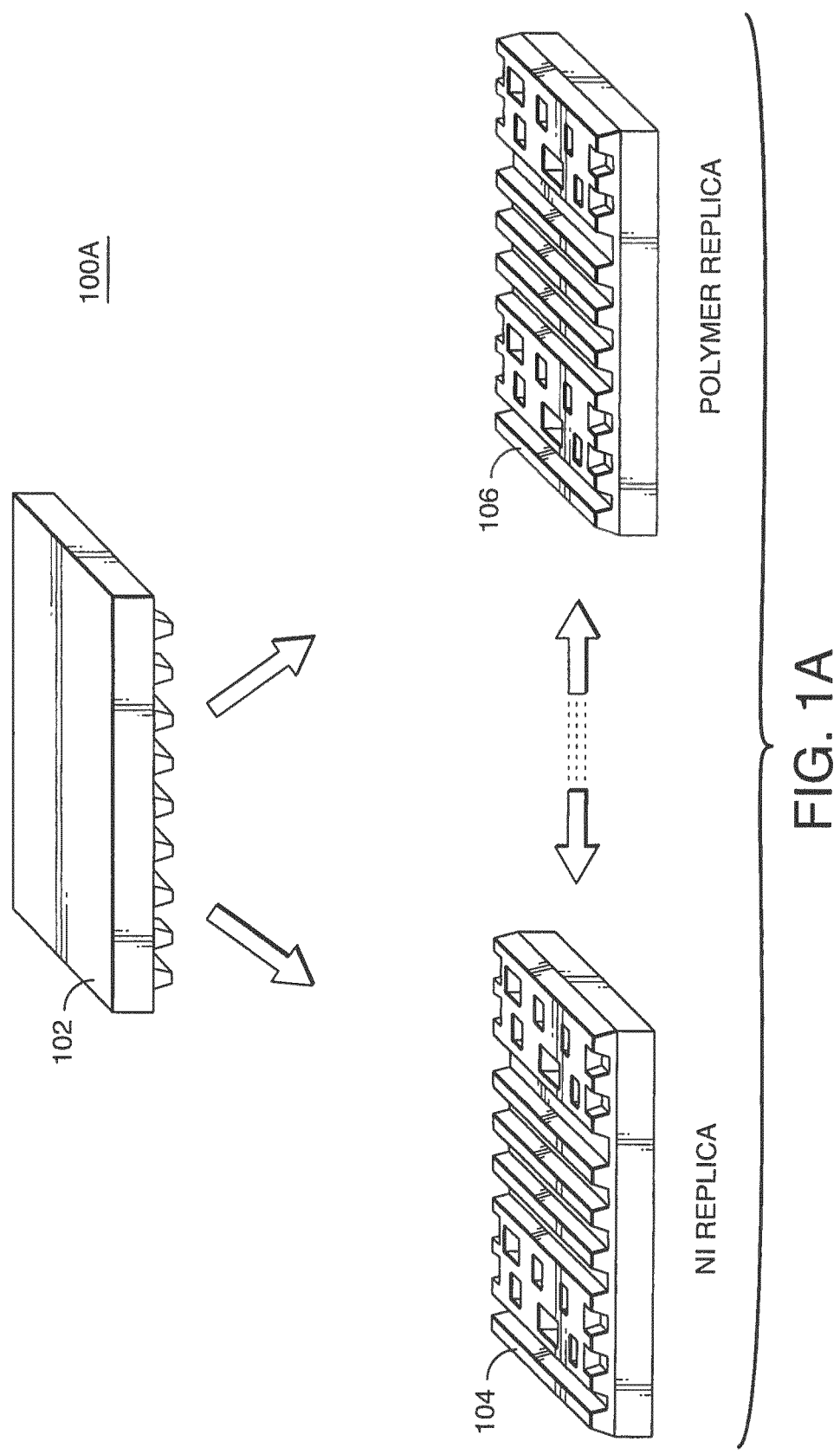
FIG. 1A depicts a schematic view of apparatus and related process flow for forming metal or polymer replica copies from an original surface relief pattern or from one another.

It should be understood by one skilled in the art that the embodiments depicted in the drawings are illustrative and variations of those shown as well as other embodiments described herein may be envisioned and practiced within the scope of the disclosure.

DETAILED DESCRIPTION

The present disclosure addresses limitations of the prior art and provides systems, methods, techniques, and apparatus useful for forming cylindrical patterning tools from one or more discrete pattern-containing parts that are suitable for use in roll-to-roll manufacturing.

Such patterning tools can be used for the replication of relief patterns that are utilized in such technical areas/fields as flexible electronics/circuitry, holography, micro/nanostructure fabrication, micro/nanoprinting, and data storage, to name a few examples. The shapes of the patterning tools can be cylindrical and/or continuous, such as a belt configuration. These patterning tools can be used for forming desired three-dimensional patterns in various media, and may be used for the mass-production of such media, as described below.

Definitions

As used for the present disclosure, the term "pattern" can denote a three-dimensional relief structure, such as shown in FIG. 1A, which depicts a schematic view of apparatus and related process 100A flow for forming metal 104 or polymer 106 replica copies from an original surface relief pattern 102 or from one another.

As used herein, the term "part" or "element" can denote a discrete substrate containing a pattern on one surface; the term "support" or "substrate" can denote a surface containing a pattern or patterned layer. A "mold" can refer to a surface containing a relief pattern which is used to create a part with a complementary relief pattern. A "replica" or "copy" can refer to a part made from a mold which has a relief pattern complementary to that of the mold. A "tool" can denote a surface containing a relief pattern used to emboss or imprint multiple complementary copies of the tool pattern, such as shown and described for FIG. 1B, which depicts a schematic view of apparatus and related process flow 1008 for drum formation and replication showing interconversion between internal and external patterns, where the process can begin with external master pattern or internal master pattern.

Figure 2A:
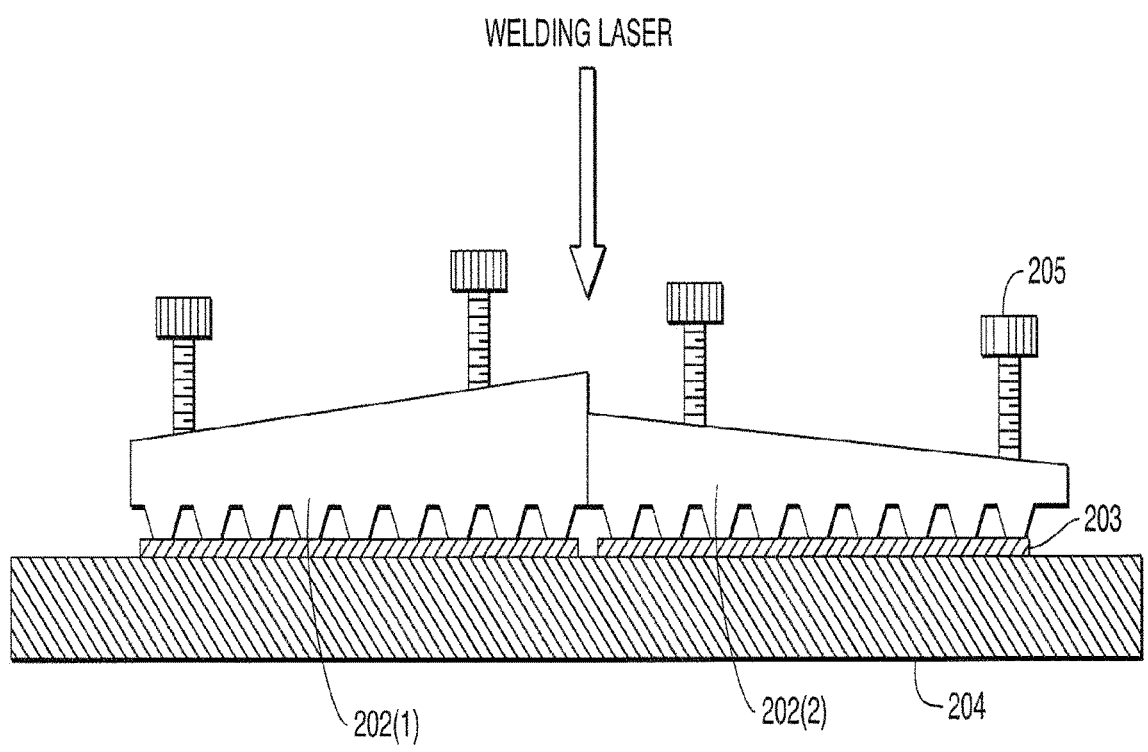
FIG. 2A depicts a fixture for improving surface flatness by minimizing effects of thickness variation at edges of abutted parts.
Figure 2B:
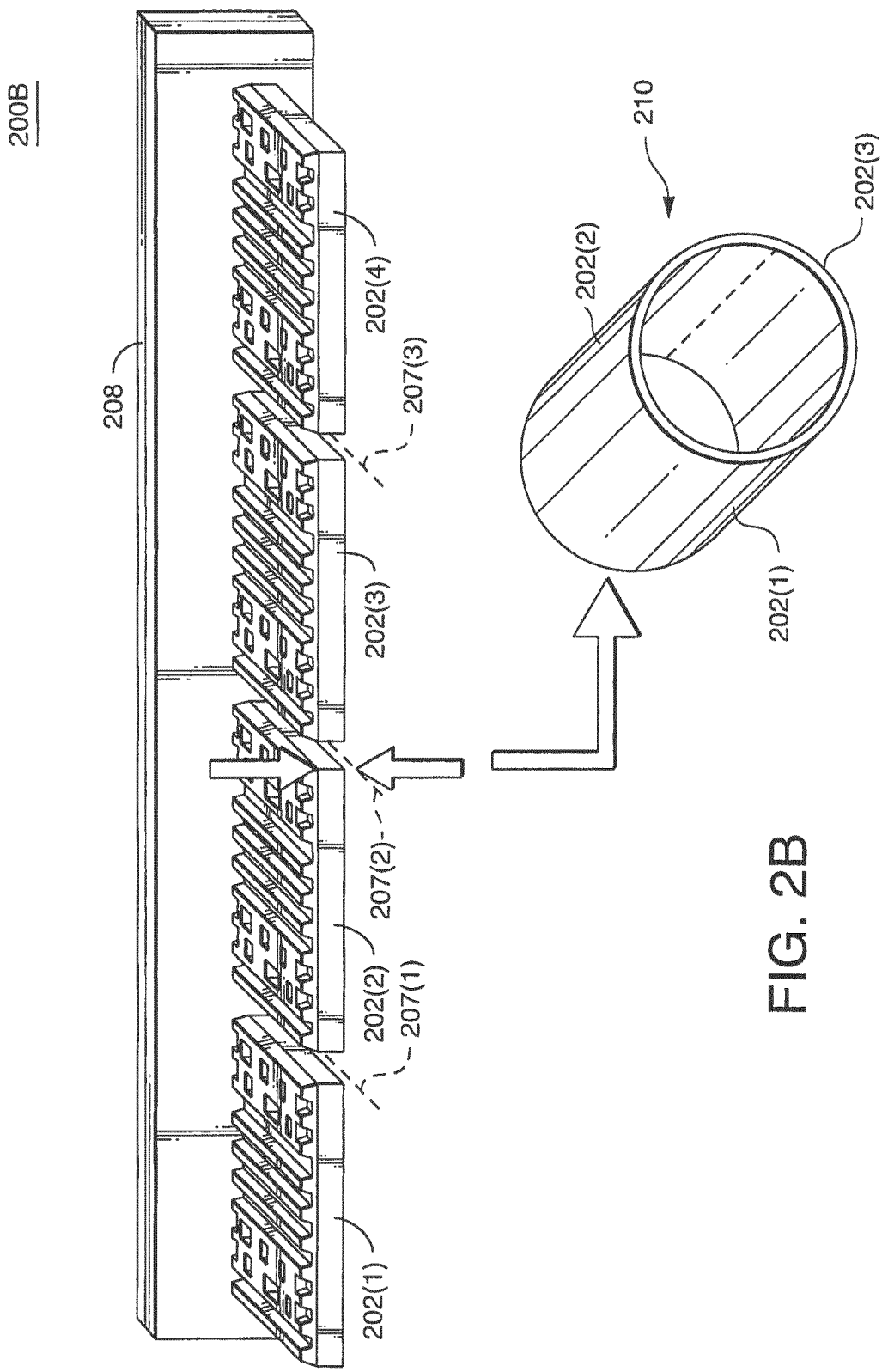
FIG. 2B is a schematic view depicting the joining of metal elements by laser welding to form externally patterned cylinder.

For the purposes of this disclosure, a "joint" can refer to the area wherein two edges abut, and a "seam" can refer to a joint that is physically connected by welding or bonding or other such means. An "improved seam" may refer to one having significantly reduced or minimal surface non-uniformities and discontinuities relative to seams of conventional tools, e.g., as formed using techniques shown as described for FIGS. 2A-2B. FIG. 2A depicts a: fixture for improving surface flatness by minimizing effects of thickness variation at edges of abutted parts. FIG. 2B is a schematic view depicting the joining of metal elements by laser welding to form externally patterned cylinder.

Further defining terms used in the present disclosure, a "continuous" patterned surface or cylinder can be one in which the substrate upon which the pattern is formed is essentially a single element. A "dry fitted" joint can refer to one in which the butted pattern edges are held against or positioned adjacent to one another by mechanical techniques without a need for welding or bonding.

Figure 3:
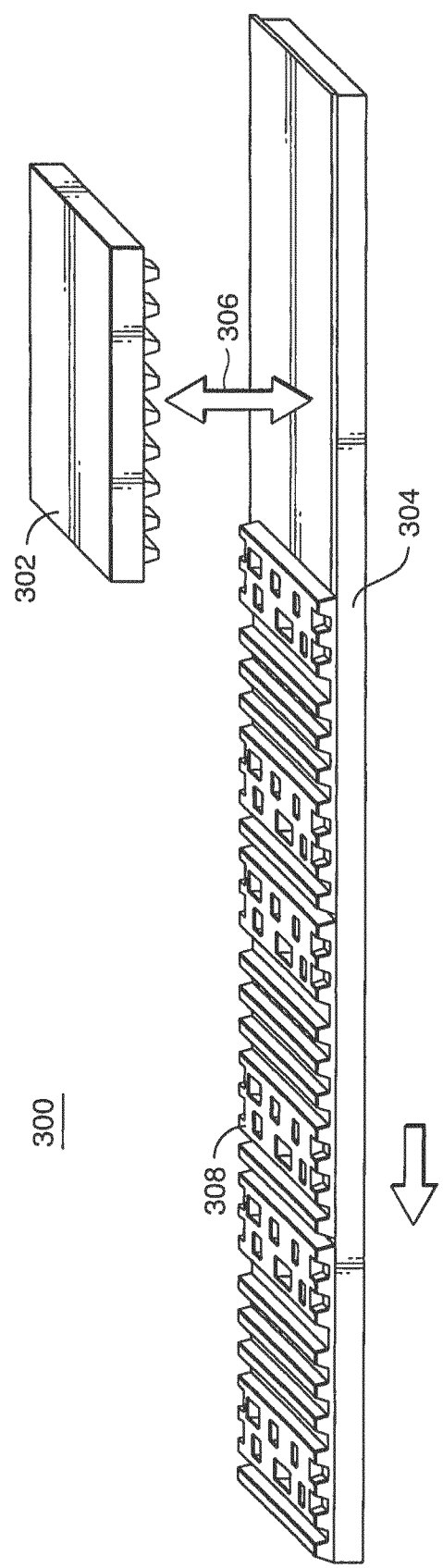
FIG. 3 depicts a step-and-repeat process for replicating discrete pattern element on continuous substrate strip using chemical, radiation curing, thermal or other imprint replication process.

As used herein a "step and repeat" process can include reference to formation of a continuous pattern of smaller abutted patterns by repeated imprinting of a patterned surface in a substrate, e.g., as shown and described or FIG. 3, which depicts a step-and-repeat process for replicating discrete pattern element on continuous substrate strip using chemical, radiation curing, thermal or other imprint replication process. "Registration" or "alignment" can refer to the positioning of adjacent parts to provide effective continuity of the patterns at a seam as if the seam did not exist. A "patterned cylinder" in the context of this disclosure can refer to a closed band in the general shape of a belt having a pattern on one surface. The subset of a belt having circular symmetry is herein referred to as a "drum".

General Considerations

In the most general terms techniques for producing patterning tools according to the present disclosure include (i) the formation of discrete patterning tools having a three-dimensional relief pattern from one or more discrete elements (e.g., flat or non-flat), such as shown in FIGS. 1A-1B, and (ii) formation of continuous or quasi-continuous (e.g., cylindrically-shaped) tools from such elements, e.g., tool 6 in FIG. 1B and tool 210 in. FIG. 2B.

Figure 4:
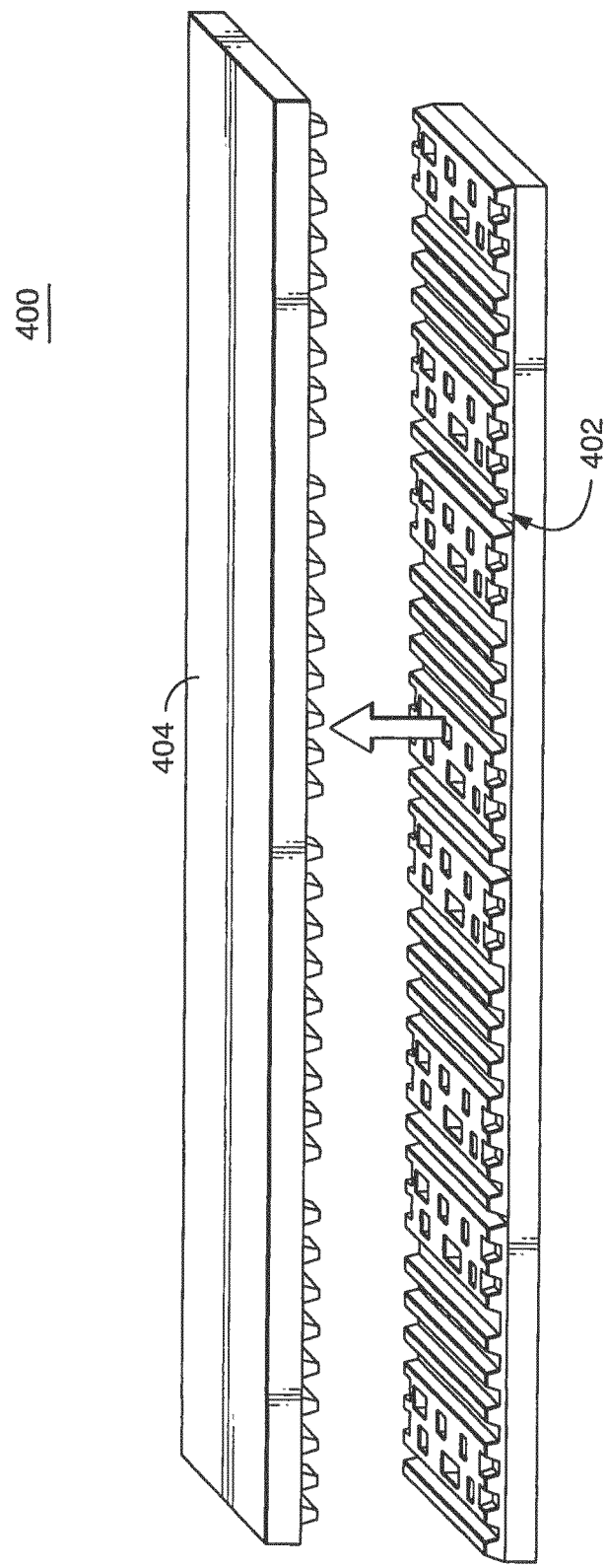
FIG. 4 depicts a conversion of a strip of patterns ("original") into a single tool, where the original can be a selected material such as a metal, polymer, silicon, glass, photoresist, etc., and the tool (copy) can be a selected material such as metal or polymer.

An original relief pattern or template (herein referred to as the "master" pattern), can be used to form a first generation copy, e.g., as shown and described for FIG. 4, which depicts a conversion of a strip of patterns ("original") into a single tool, where the original can be a selected material such as a metal, polymer, silicon, glass, photoresist, etc., and the tool (copy) can be a selected material such as metal or polymer.

A first generation copy can in turn can be used to form a second-generation. copy. A third-generation copy (or subsequent-generation) can be made from the second-generation copy, etc., where each successive tool generation has the inverse pattern relative to the previous generation (FIGS. 1A-1B). In the optical disc and related fields, such tool generations are often called "fathers", "mothers", "sons", etc., and the overall replication process and elements for a pattern are similarly referred to collectively as a "family tree." FIG. 1A depicts a schematic of process flow for drum formation and replication showing interconversion (e.g., use for making a complimentary pattern) between internal and external patterns. As shown in FIG. 1B, a patterning forming process can begin with an external master pattern (1) or internal master pattern (3).

Methods, techniques, apparatus, and systems according to the present disclosure can include one ore more of the following: the formation and use of multiple copies and multiple generations of an cylindrical pattern, the precise and accurate preparation of the edges of the individual pattern elements to enhance the combination thereof to form an extended pattern having seams with minimal artifacts, and the treatment of pattern elements and tools to enhance release of replicated parts and protect the patterned surfaces.

Master Pattern Creation

An original discrete pattern ("master") can be formed by any of a number of suitable techniques, including lithography, holography, direct e-beam or laser writing, ablation, embossing, etc. For example, the master pattern may consist of a substrate containing a layer with a component sensitive to actinic radiation, such as a photoresist typically used in optical or e-beam lithography (e.g., made by Shipley Company, etc.) and which can be positive or negative working. The resist can be coated on a silicon or other semiconductor wafer, or glass, quartz, polymer or other such substrate. The photoresist layer is patterned by standard techniques (e.g., exposure, development, post-processing, etc,) and the resulting relief pattern may be used as an etch mask to transfer the pattern to an underlying surface (silicon, glass, etc) through the use of a process such as plasma etching, or the pattern may be used as a template for making a next-generation copy relief copy, etc.

In another example, the pattern-forming layer can be an ablative material, such as for example, a polymer, dye polymer, or metal or alloy (e.g., Bi, Te or a Te alloy, etc.) or other suitable material that can be vaporized or physically deformed by the action of the incident radiation (laser, e-beam, particle beam, etc.). In a further example, the pattern-forming layer could consist of a soft polymeric or metallic material that can be deformed by the action of a precision stylus (atomic force microscopy—AFM, etc.) or suitable cutting tool. The pattern can be formed by processes such as graphic art or ink jet printing, where the relief pattern is built up by the addition of material ("additive" processes). Other suitable techniques for forming relief patterns according to the present disclosure can include but are not limited to thermal embossing, chemical embossing, imprint lithography, self-assembly, etc.

Creation of Multiple Pattern Copies and Generations

FIGS. 1A-1B illustrate systems, apparatus, and processes by which curved or cylindrical tools may be made, and include depiction of the formation of one or more flexible versions or generations of an original (flat) pattern. FIG. 1A depicts a schematic view of apparatus and related process flow for forming metal or polymer replica copies from an original surface relief pattern or from one another FIG. 1B depicts a schematic view of apparatus and related process flow for drum formation and replication showing interconversion between internal and external patterns, where the process can begin with external master pattern or internal master pattern;

It is thus very useful to be able to make multiple, precise copies of an original pattern for the formation of cylindrical tools. Utilizing replicas of an original pattern offers several advantages, such as in cases where the original pattern is fragile or supported on a fragile or inflexible substrate (photoresist, glass, Si wafer, etc.), or when the original has the inverse symmetry ("mirror image") of the desired pattern, or when multiple identical copies are required (such as to form an extended tool), etc.

Figure 8:
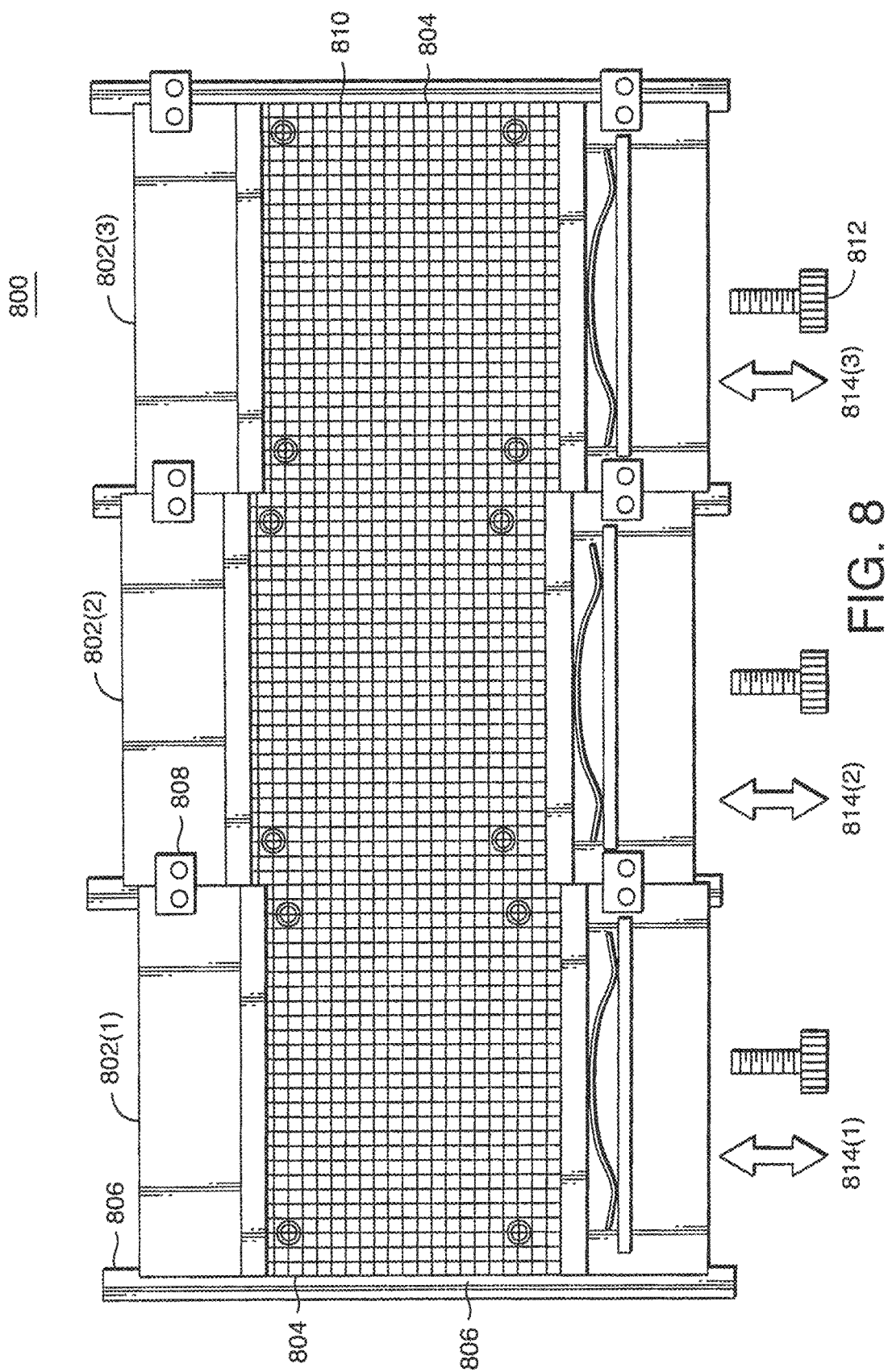
FIG. 8 depicts a configuration of a multiplicity of parts mounted in three fixtures similar to those of FIGS. 6-7, illustrating interconnection by precision slides.
Figure 9:
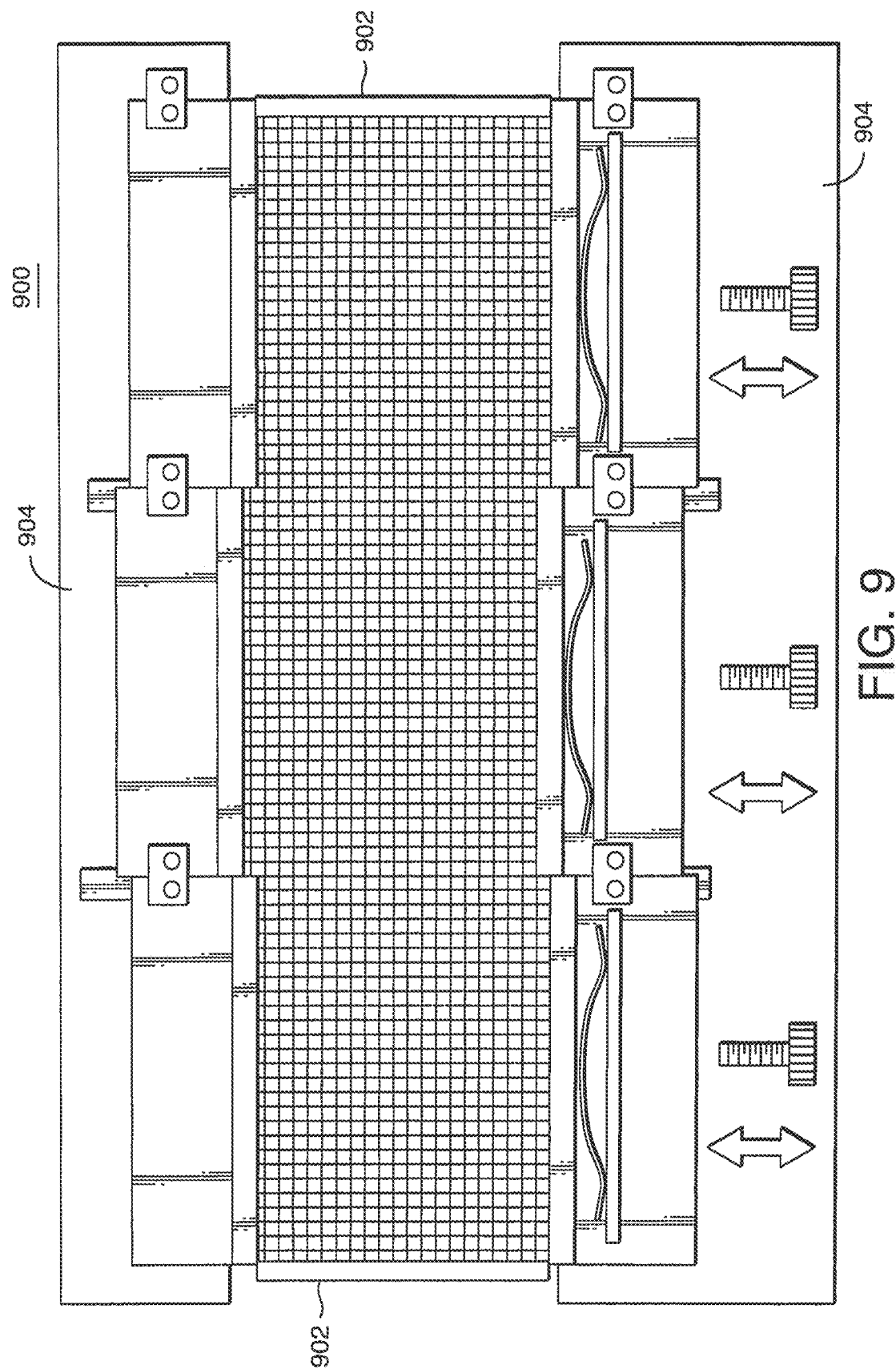
FIG. 9 depicts a configuration similar to that of FIG. 8 with the addition of a "mask" to combined the fixtures to prevent/reduced metal plating or polymer replicating material from contacting fixture components.
Figure 10:
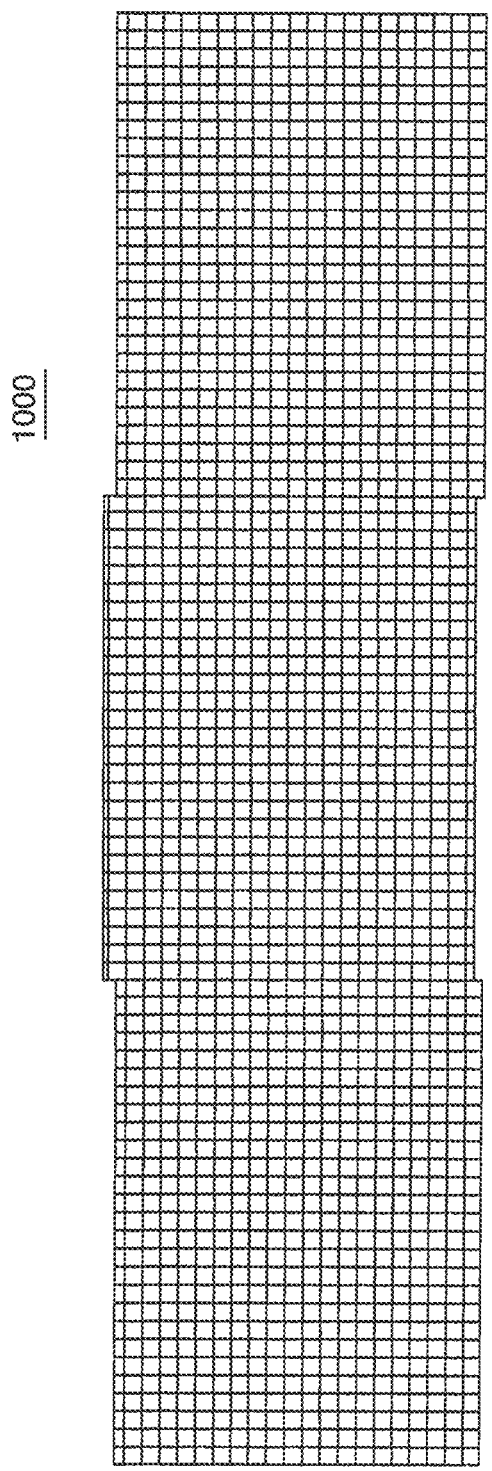
FIG. 10 depicts a continuous part after separation from combined fixtures such as shown in FIGS. 8-9.

FIG. 10 depicts a continuous part after separation from combined fixtures such as shown in FIGS. 8-9. This can be used as direct tool, or as "mold" for subsequent tool, Note offsets in long edges are exaggerated to show affect of precision alignment. These edges are non-critical but can optionally be trimmed straight.

A number of techniques for making precise copies of relief patterns can be utilized in accordance with the present disclosure, including the use of radiation curable polymeric materials (UV, e-beam, thermal), chemically/thermally curable materials (epoxies, silicones, anaerobics, etc.). Holographic techniques may be used to make copies, including techniques as available by Holographix LLC, etc). Another technique by which patterns may be accurately replicated is that of metal plating, such as by Ni electroforming or electroless deposition. Other suitable techniques, including chemical vapor deposition (CVD), may be used. During the 'parting' or separating process following replication, surface passivation, release coatings, and/or other means known to the art are often used to minimize damage to the original and replica parts.

The above techniques, as well as others, may be usefully employed in the formation of cylindrical patterning tools, in accordance with the present disclosure.

Precision Edge Preparation and Alignment/Registration of Patterns

It is a method of the present disclosure that the pattern elements used to form the patterning tool or replicas thereof have edges that are very uniformly and precisely cut and finished as a means of producing tools that are "near-seamless" (i.e., have seams that are minimally disruptive to the embossing/imprinting process for which they are used). The specific benefits of tools with such seams include higher material yields (less non-patterned "waste"/out-of-spec" material at or near the seams, reduction of contamination of "good" pattern areas by waste material generated at seams, fewer artifacts to cause "print-through", "blocking", or out-of-roundness in manufactured rolls, etc.), and extending tool life (reduced contamination of tool from seam-generated artifacts, less drum/roller "bounce" at seams at higher speeds or nip pressures which interfere with efficient roil-to-roll machine operations, etc.).

Patterning applications frequently require alignment or registration of pattern features from one element to the next in order to produce extended or continuous patterns. Several techniques can be used to facilitate this requirement, such as: incorporation of specific features in the master pattern, use of characteristic elements intrinsic to the pattern itself, addition of fiducial (reference) elements to the pattern at a subsequent stage of the tool replication process, etc. Such alignment/registration features can take the form of guide patterns rulers, reticle patterns, moiré patterns, diffractive patterns, etc, which can be used to optically or electronically guide a processing operation (diamond cutting, laser cutting, EDM wire burning, milling, grinding, shearing, water jet cutting, etc.) to produce a well-formed edge.

Joining Pattern Elements with Minimum Disruption

Techniques for joining individual elements described in the present disclosure can fall into two general categories: physically connecting by welding or adhesive bonding or other such means, and "dry fitting" by bring parts into intimate contact without bonding. Each approach offers specific benefits for specific applications.

Welding/Bonding

Techniques such as welding and bonding can be used to physically connect individual elements to form a strip, or closed form such as a belt or drum. In the case of metal parts, conventional welding generally results in a significant amount of damage near the weld caused by the typical large area that is heated during the process.

Figure 5:
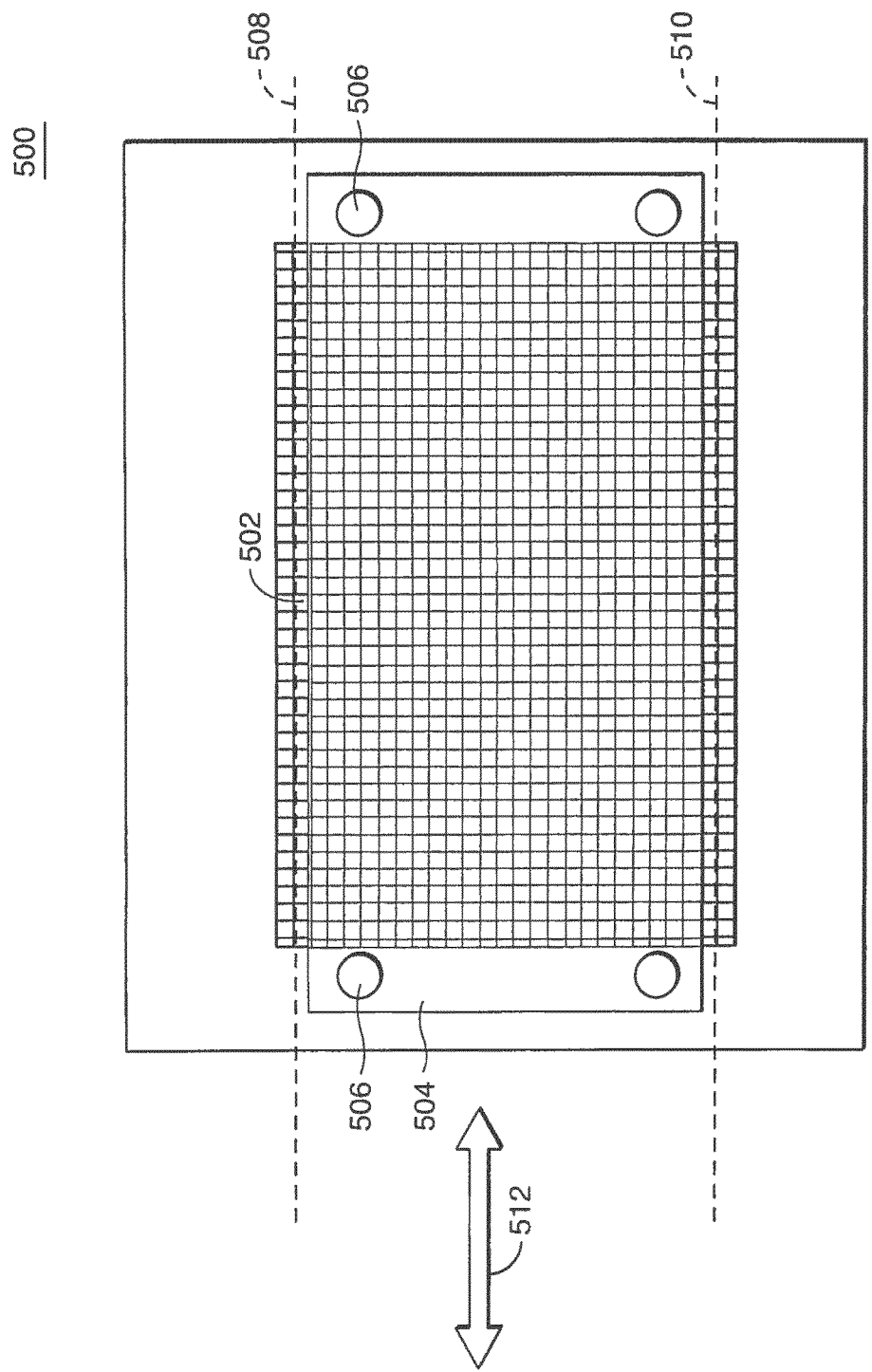
FIG. 5 depicts a first fixture for holding a pattern to be copied, without damage, while first precision cuts are made using embedded reference marks, for subsequent transfer of the pattern to a second fixture.
Figure 6:
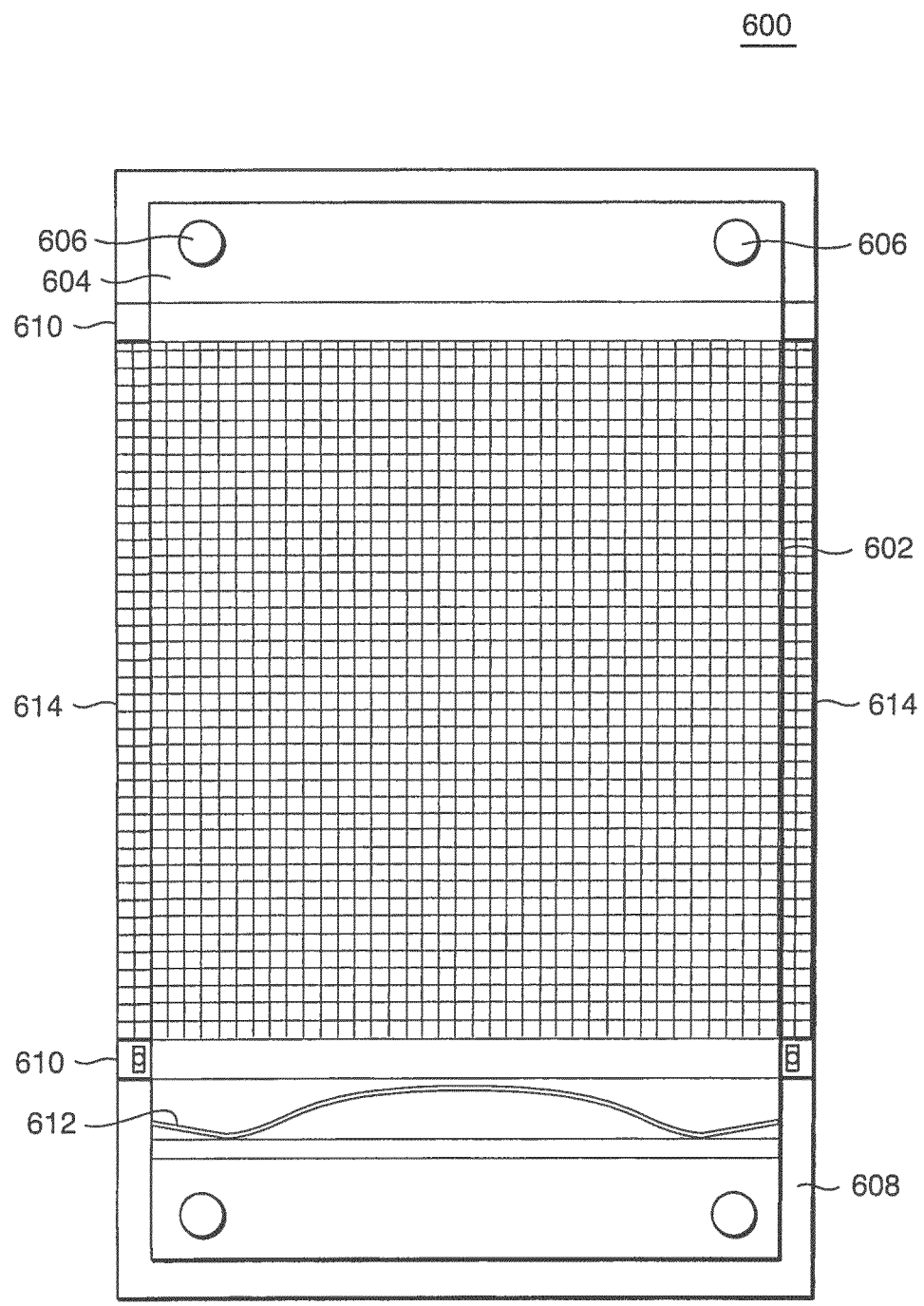
FIG. 6 depicts a second fixture for holding a pattern to be copied, without damage, while second precision cuts are made using embedded reference marks.

FIG. 2A depicts a fixture 200A for improving surface flatness by minimizing effects of thickness variation at edges of abutted parts. Patterned surfaces 202(1)-202(2) are protected with mask layer 203 and loaded against reference surface 204 from a back side using compliant member 205 (screws, springs, elastomer, etc.) prior to welding or bonding. Precision laser micro welding may be utilized according to the present disclosure to butt-weld parts having precisely finished edges, e.g., as depicted in FIG. 2B. FIG. 2B is a schematic view 200B depicting the joining of metal elements 202(1)-202(4) by laser welding to form externally patterned cylinder 210. Each element is cut using marks embedded in pattern and all are then aligned to flat reference surface 208 for welding to eliminate taper in finished drum 210. Laser micro welding using commercially available equipment, such as such as suitable Nd:YAG lasers, is capable of producing a very narrow weld line 207(1)-207(3) (commensurate with the laser spot size) with minimal material deformation beyond the joint, due to the ability of the laser to be focused to a very small spot and to utilize short duration pulses to minimize thermal damage. Preparation and cutting of the edges (in registration with the pattern, if necessary) of the individual parts is shown in FIGS. 5-6.

Other physical joining techniques include e-beam welding, adhesive bonding, solvent welding, etc. It should be noted that because butt-joining primarily uses the generally restricted surface area of the two edges being joined, reinforcement of the seams by adhesive bonding or soldering, etc of a support strip to the underside of the part may be useful in extending the lifetime of such seams, particularly in applications where high loading forces or constant flexing may weaken a joint. Polymer parts can be welded using solvent, epoxies, UV or e-beam cured adhesives or thermal curing and may also use backside reinforcement techniques. Subsequent mounting, discussed below, of such reinforced joints may require compensation of the mounting part in the form of shallow trenches, etc., to enable the seam to lie flat on its underside support.

It is also a feature of the present disclosure to improve the surface flatness at the seam by the reduction or elimination of step height differences resulting from thickness variations of the individual parts. Polymer films commonly exhibit thickness (gauge) variations as a result of non-uniformities in the extrusion and film stretching processes, among other things, by which they are made in electro-metal and electroless metal depositions, thickness variations result from electrical field or surface nucleation non-uniformities and fluctuations. The resultant thickness difference between butted parts is minimized or eliminated in this disclosure by clamping the elements with the patterned faces (suitably protected by an overcoat film or mask) against a flat (reference) surface during the joining operation using a compliant member, when force can be applied to the back surface of the parts by use of springs or elastomeric components, etc. (FIG. 2A). If alignment of the pattern across the parts is also required, the reference flat can be a transparent material (glass, etc.). By these techniques, the critical patterned surfaces are in the same plane, and any mismatch in thickness between the pieces being joined occurs as a step on the inside of the bond or weld. The mounting of a pattern cylinder with steps on its inner surface can be compensated for by use of a compliant (elastomeric layer, or epoxy/adhesive) layer or fill between the inner pattern surface and an inner support member (e.g., as compared with FIGS. 16A-16B).

Dry Fitting

Various techniques according to the present disclosure cab be used for the formation of improved seams with minimum distortion or artifacts. Because melting of edge material (in the case of welding) or addition of material (in the case of adhesive bonding) is required to form a seam, in some situations there may be some area near the seam in which the pattern is obliterated, with the formation of a trench or ridge. Exemplary embodiments of the present disclosure, therefore, form and provide significantly improved seams between pattern elements by a process generally including: 1) the precise cutting and edge finishing of the individual pattern elements (by one or more of edge preparation techniques described above), followed by 2) mechanical assembly ("dry fitting") of said individual parts, and with patterns in registration if required, followed by 3) the creation of a single continuous replica of the entire assembly of individual parts, using any of a number of methods known to the art.

Examples of embodiments of joining and/or preparing pattern segments according to the present disclosure are shown and described relative to FIGS. 5-9 herein, with reference characters shown. FIG. 5 depicts a first fixture 500 (with plate 504 and screws 506) for holding a pattern 502 to be copied, without damage, while first precision cuts 508, 510 are made using embedded reference marks, for subsequent transfer (shown by 512) of the pattern to a second fixture;

FIG. 6 depicts a second fixture 600 for holding (by plate 602, screws 606, back surface 608, and spring 612) a pattern to be copied 614, without damage, while second precision cuts (610, 614) are made using embedded reference marks. These two edges can be and are preferably highly finished (by diamond turning, grinding, polishing, etc.) for precise fit to other pieces. The part 614 is left on fixture 600 during subsequent tool forming process.

Figure 7:
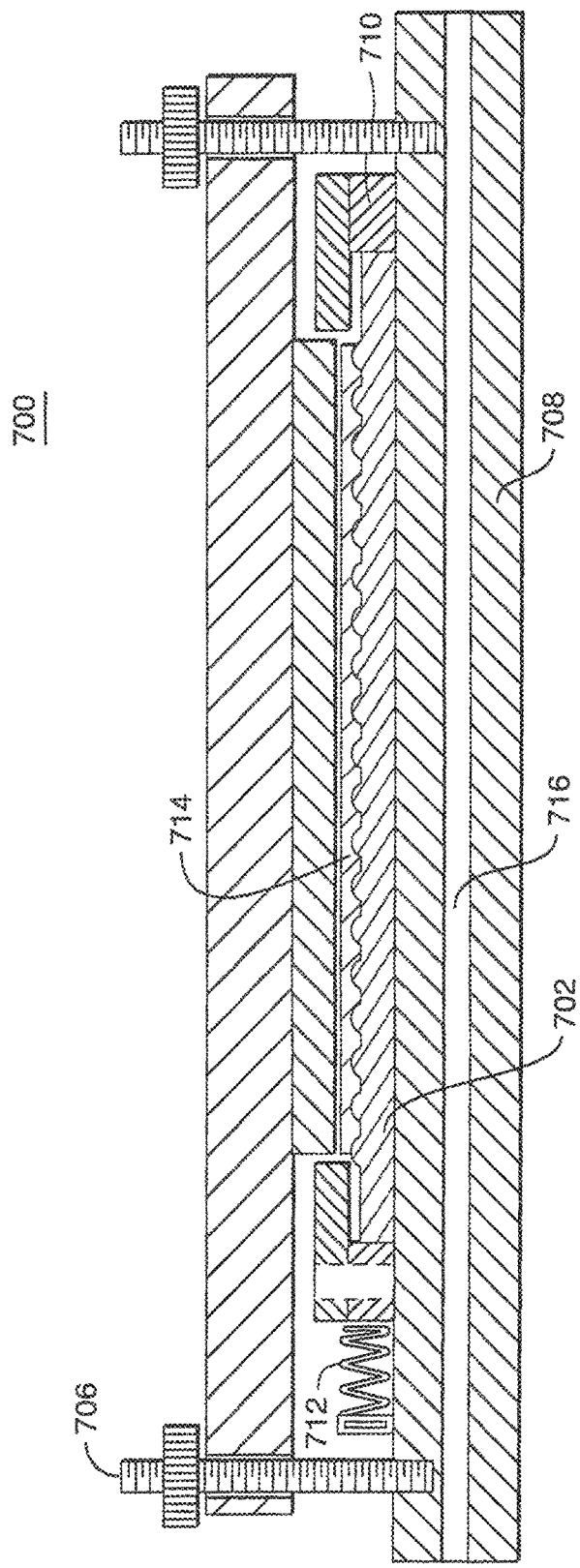
FIG. 7 depicts a side view of a fixture similar to that of FIG. 6, showing pattern element, protective mask layer, and hold-down plate.

FIG. 7 depicts a side view of a fixture 700 similar to that of FIG. 6, showing pattern element 702, protective mask layer 714, and hold-down plate 710 with screws 706. Spring-loaded edge guide 712 and hold-down plate 710 keep the part 702 in place during edge finishing and subsequent tool forming process. "Stops," connected to 710 also serve to define/constrain the edges of the replicated part (either plated metal or polymer). Plate 708 and gap 716 are also shown as part of the fixture 700.

FIG. 8 depicts a configuration 800 of a multiplicity of parts mounted in three fixtures 802(1)-802(3) connected by 808 similar to those of FIGS. 6-7, illustrating interconnection by precision slides 806, with movement indicated by arrows 814(1)-814(3). Patterns 804 are aligned to one another using microscope/camera (not shown) and micrometer adjustments (indicated by 812). Locking clamps are engaged after verification of alignment as shown by continuous line 810. Outer two edges may be finished with matching bevels for drum mounting.

FIG. 9 depicts a configuration 900 similar to that of FIG. 8 with the addition of a "mask" 902 to combined the fixtures to prevent/reduced metal plating or polymer replicating material from contacting fixture components. Outermost edges can have stops 904 that give matching bevel if replicated strip is to be subsequently used in drum fixture.

Suitable specific methods for making replica cylindrical tools by Ni electroforming, electroless deposition, radiation curing and other means are covered in detail in related application Ser. No. 11/509,288, filed 24 Aug. 2006 and incorporated herein by reference.

For such exemplary embodiments, the edges of the individual components (e.g., pattern elements) can preferably be prepared in such a way as to minimize typical machining artifacts, such as burrs, nicks, warping, etc. which contribute to seam non-uniformities. This can be accomplished, as previously mentioned, by the use of finishing techniques that produce very smooth cuts, including EDM wire burning, diamond cutting, precision grinding or shearing, water jet cutting, etc). Post cut processing techniques, such as edge polishing, can be used to further improve the quality of the edge and hence the fit of the abutted parts.

Dry fitting techniques can benefit from the individual components being held securely during the formation of the continuous replica tool. Such holding of the pattern segments/elements can be accomplished by any of several techniques, including the use of mechanical (compression, etc.) clamping, vacuum or electrostatic hold-down, pressure sensitive adhesives (on the back but generally not the edge of the part). In applications utilizing one or more magnetic metal substrates, magnetic clamping (including the use of strong Neodymium magnets, such a "N40" etc., with Ni tools) may be used. In addition, one or more of such, holding techniques may be used simultaneously. For example, mechanical damping may be used in conjunction with magnetic hold down, etc.

Continuous Near-Seamless Drum Tool

Figure 11:
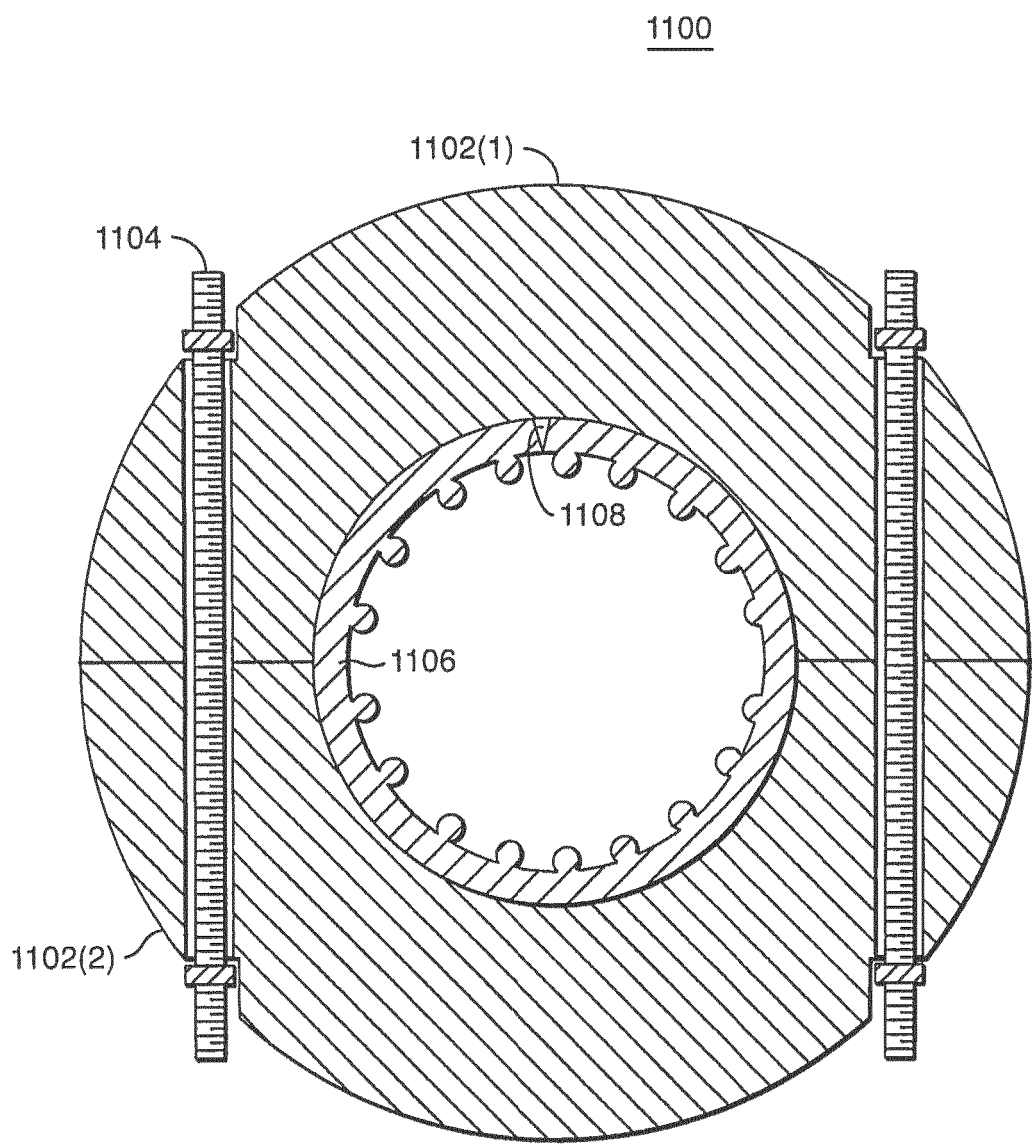
FIG. 11 depicts a pattern strip mounted in a two-piece shell fixture, with the pattern facing radially inward.

In a particular embodiment for forming a continuous near-seamless drum, the strip 1000 shown in FIG. 10 (such as formed by techniques illustrated in FIGS. 5-9) is inserted (pattern facing inward) into an expanded two-piece drum shell fixture. See, FIG. 11, which depicts a pattern strip 1106 mounted in a two-piece shell fixture 1102(1)-1102(2), with the pattern facing radially inward. The inner diameter of shell 1102(1)-1102(2) can be machined to match the outer diameter of pattern strip 1106 after insertion. Edges (shown by 1108) of strip 1106 can be formed with matching bevel for precision fit.

By drawing the shell segments together (e.g., by screws 1104 in FIG. 11), the strip is held in contact with the inner wall of the shell, and the strip edges in contact with each other, by compressive forces. It is a method of this disclosure that the length of the flat strip (e.g., as determined by the length of the fixture in FIG. 9) be such that when the strip element is inserted into the drum fixture and the drum fixture is closed, the outside diameter of the rolled strip and the inner diameter of the closed shell are essentially the same, thus the strip forms a virtually uninterrupted (near-seamless) cylinder, and subsequent tools made from it have likewise the same property.

For facilitation of the matching or alignment of the edges of the strip match up optimally within the shell fixture, the proper bevel angle formed by the butted ends of the strip when inserted into the shell is used in the flat fixture's end stops (FIG. 9) such that, when the strip is secured within the shell, a very precise near-invisible match is created. Replication of this "dry fitted" joint results in a further improved near-seamless drum tool.

Figure 12:
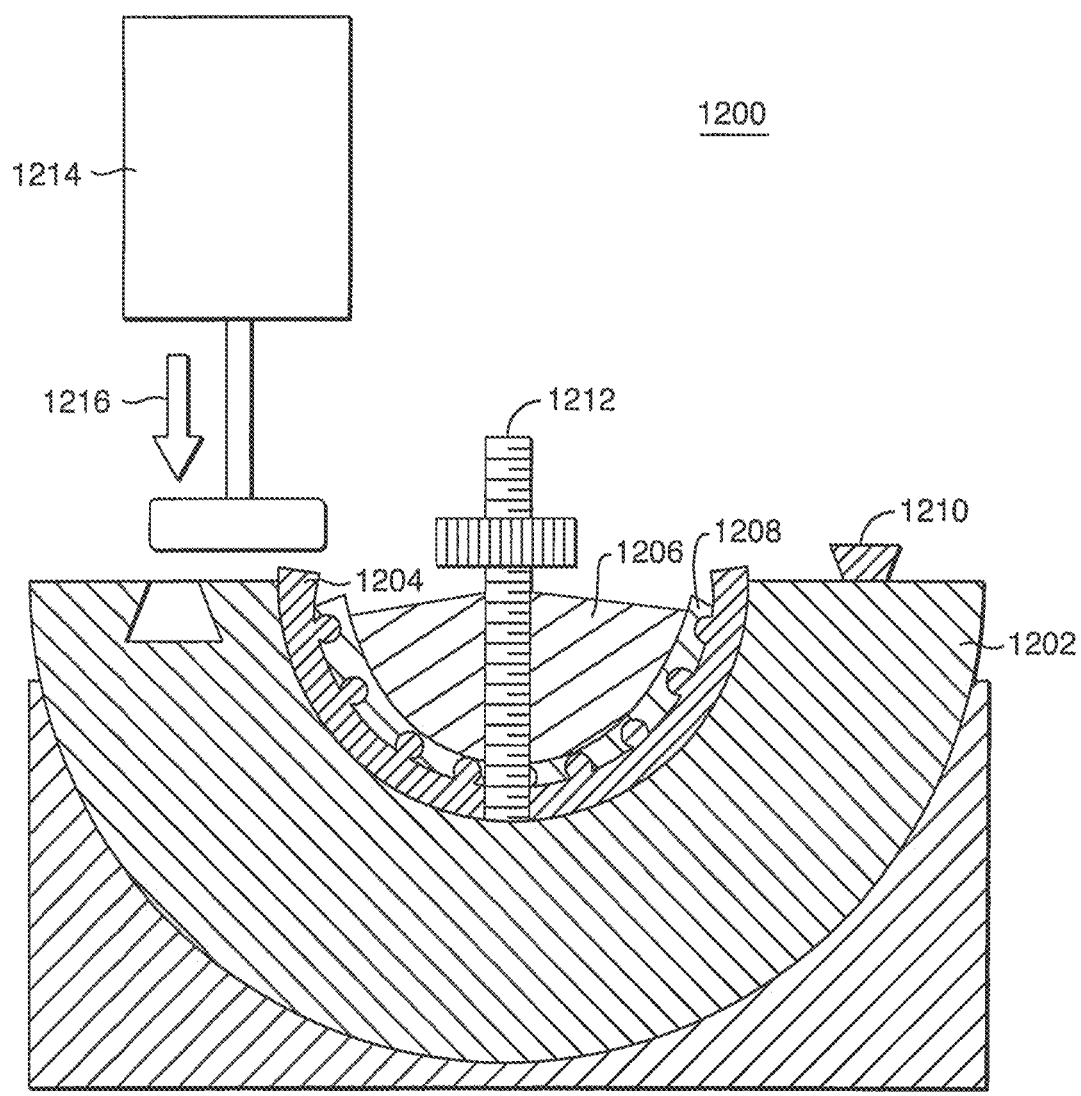
FIG. 12 depicts an alternative embodiment of a fixture for drum tool formation in accordance with the present disclosure.

FIG. 12 depicts an alternative embodiment 1200 of a fixture for drum tool formation in accordance with the present disclosure. A pattern part 1204 is mounted in curved semi-cylindrical fixture 1202 (after first two cuts have been made using 1$^{st}$ fixture, see e.g. FIG. 5). End stops are used to ensure edges will be cut perpendicular to first cut edge, and part is clamped in place. Excess part extending from fixture is trimmed flush to shell using precision cutting techniques indicated by 1214, 1216 (diamond cutting, grinding, EDM, polishing, etc.).

As shown in FIG. 12, in exemplary embodiments the flat fixture shown in FIG. 6 can be replaced with a curved fixture 1206. Once alignment is completed and the halves clamped securely, the curved clamp (FIG. 12) is extracted (clamping posts 1212 are located outside of the "active" pattern area), the protective mask 1208 is removed, and the fixture 1200 is ready for the replication process.

Figure 13:
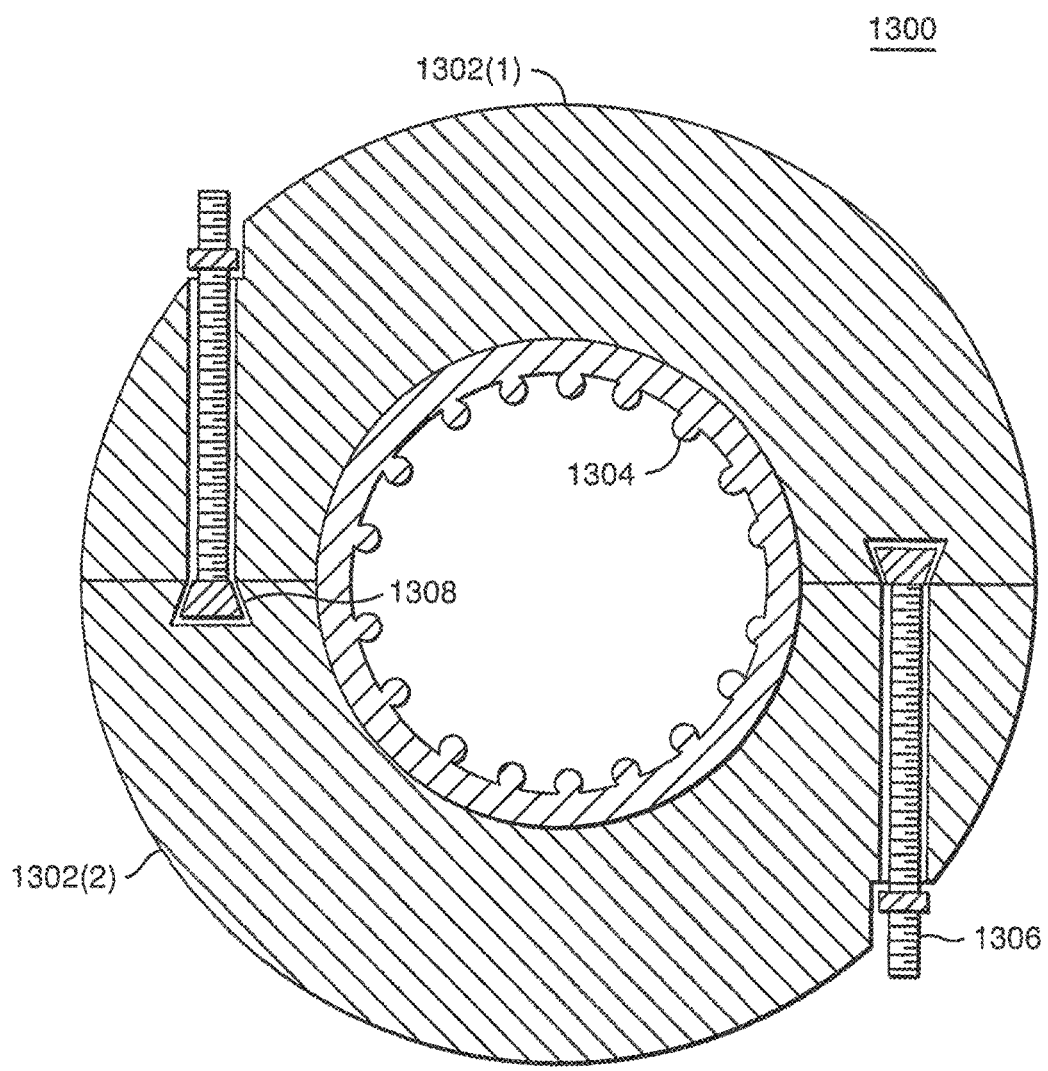
FIG. 13 depicts an alternate embodiment of a two-piece drum forming fixture including two assembled semi-cylindrical shell halves and pattern elements.

FIG. 13 depicts an alternate embodiment 1300 of a two-piece drum forming fixture including two assembled semi-cylindrical shell halves 1302(1)-1302(2) and pattern elements 1304. Precision dovetail slides 1306 allow the shell halves to move to allow pattern alignment and subsequent locking of fixtures in place (microscope camera optics and adjustment micrometer screws not shown).

Two such identical shell halves 1302(1)-1302(2) shown in FIG. 13 can be connected using dovetail slides or the like that allow, through the use of a micrometer screw or the like, one half to slide with respect to the other, thereby enabling alignment (with the use of proper optics) of the inner patterns.

Figure 14:
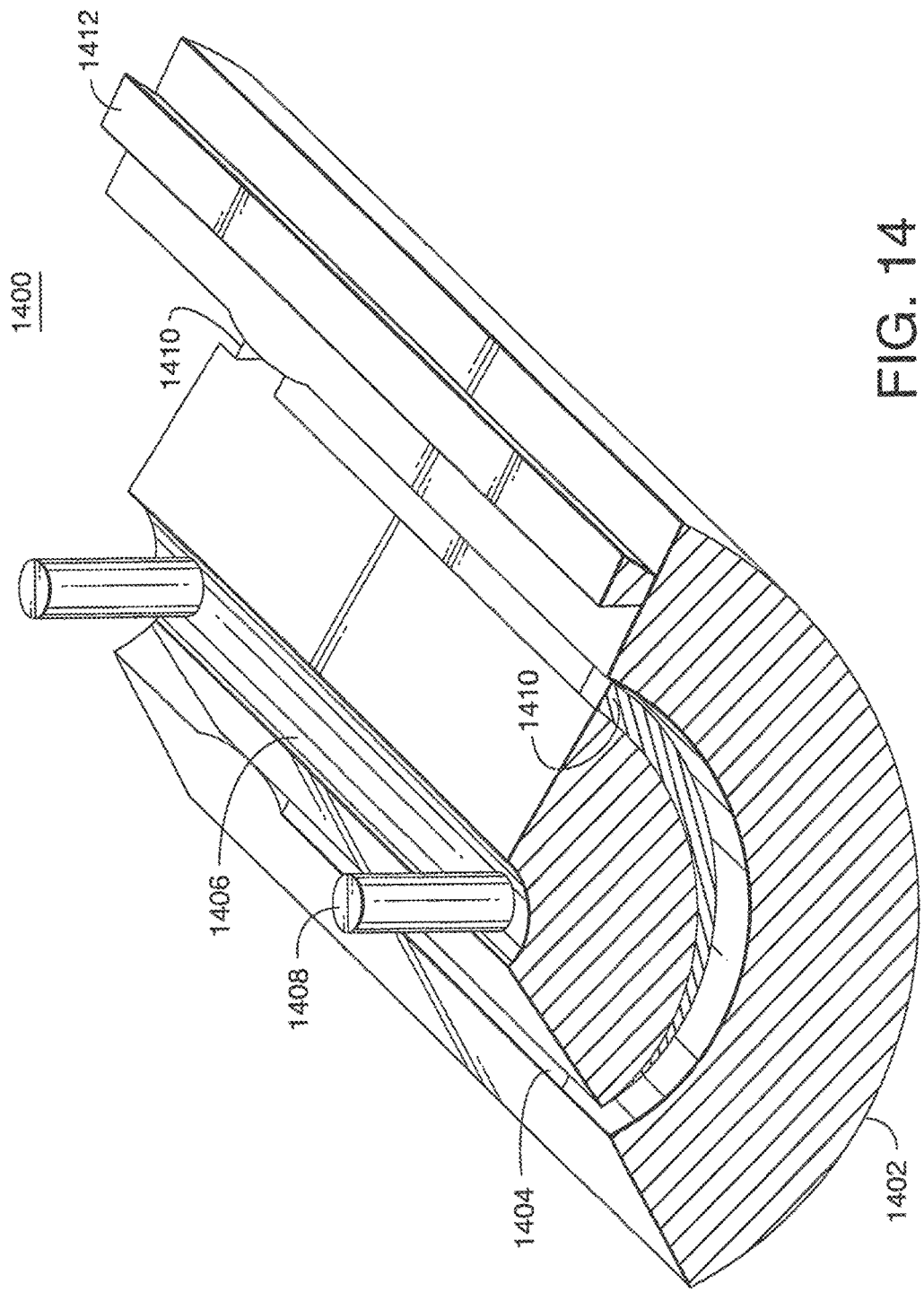
FIG. 14 depicts a cylinder shell component configured for use in a three-piece drum forming fixture.
Figure 15:
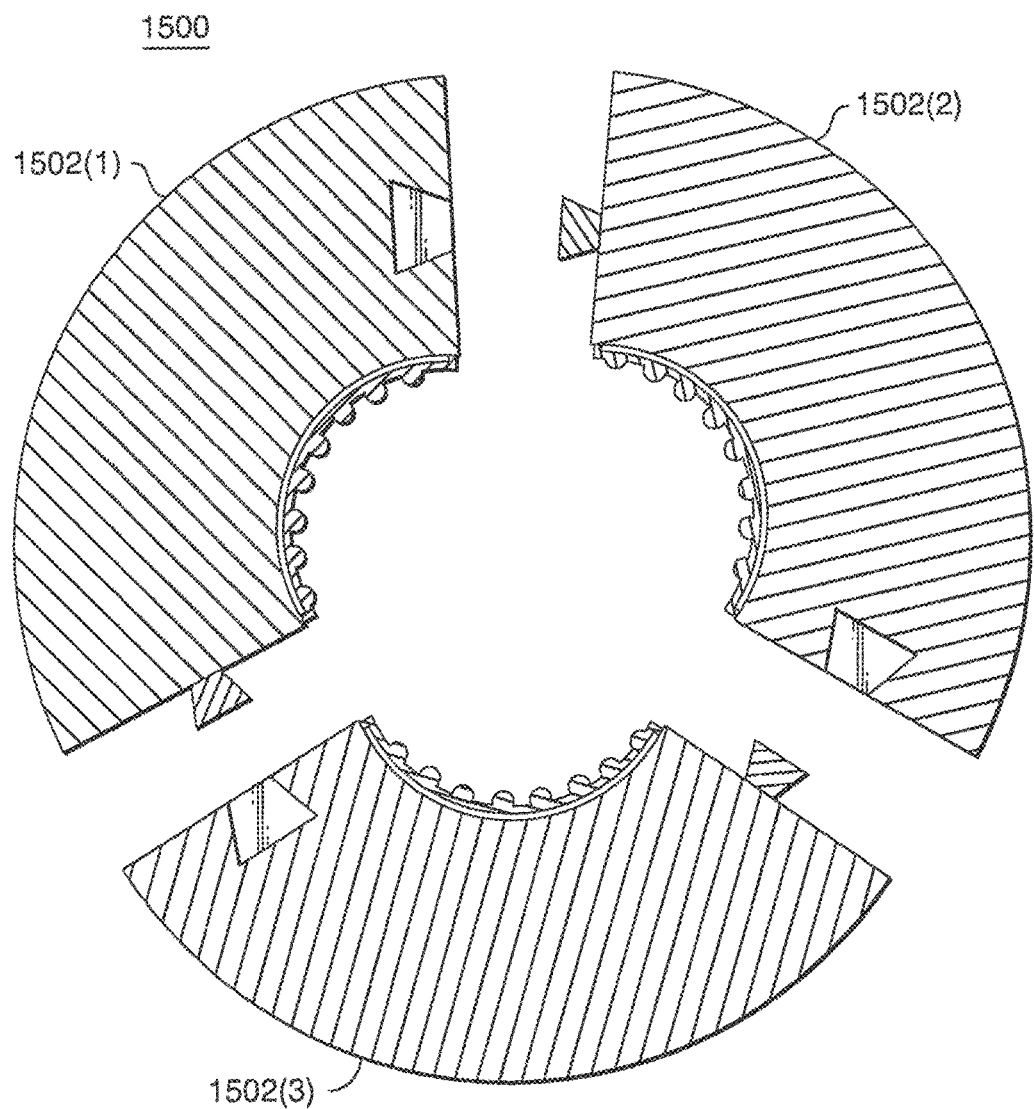
FIG. 15 depicts an expanded and disassembled configuration of a three-piece shell according to an embodiment of the present disclosure.

The previously mentioned embodiment can be extended by the use of a shell with three segments or more segments as shown in FIGS. 14-15 by 1400 and 1500, respectively. FIG. 14 depicts a cylinder shell component 1402 configured for use in a three-piece drum forming fixture, in perspective view, with features 1404, 1406, 1408, 1410, and 1412 similar to those depicted in FIG. 13. By extension of this technique, drum shell fixture comprising any convenient number of elements can be used. FIG. 15 depicts an expanded and disassembled configuration 1500 of a three-piece shell according to an embodiment of the present disclosure. The use of three or more segments 1502(1)-1502(3) may be particularly useful for large drums where it may not be practical to form long strips, or where a multiplicity of patterns is required.

Aspects of the present disclosure can provide for the ready disassembly of a multi-part shell to extract the replicated tool. Similarly, an individual element that is damaged may be replaced without the need to replace the others.

In another embodiment, the continuous strip pattern formed in FIGS. 8-10 can be formed into a cylinder by joining of the ends to form a continuous cylinder by means of laser welding or other bonding method mentioned previously. This method offers a further improvement over the use laser welding or adhesive bonding to join each and every joint by the reduction the number of welds/bonds to one, which in some cases can be designed to correspond to a natural "break" in a pattern (e.g., separating large video displays or circuits comprised of multiple "near-seamless" joints by a larger laser/bonded joint).

Step-and-Repeat, Mosaic & Ganging

Embodiments of the present disclosure (300 of FIG. 3) can function or operate to form a continuous strip substrate 304 by the repeated replication and displacement ("step-and-repeat") (indicated by arrow 306) of a smaller pattern onto the strip (see FIG. 3), which can be formed into a continuous cylindrical tool by any of the means described herein. The replication operation can be accomplished by means known to the art, such as radiation, thermal, or chemical curing, etc. After an impression/replication is made, the tool 302 is separated and it or the substrate 304 is translated into a next position on the substrate. Precise alignment of pattern features (i.e., minimization of "stitching" errors) from one replica to the next is achieved by use of alignment marks embedded in the tool and precision optical and positioning equipment, e.g., as commercially available. By changing the master tool during the step-and repeat process, a substrate having a multiplicity of different patterns ("mosaic") 308 can be formed.

In another embodiment 400 of FIG. 4, the single strip element 402 formed by the above means, or a multiplicity of individual elements that has been "ganged" (butted or joined by any of the methods of this disclosure) can be used to form another ("mirror image") continuous single strip element 404 (FIG. 4), again by means known to the art of electroforming, electroless deposition, polymer replication or any of the copying methods referred to in this disclosure.

Figure 17:
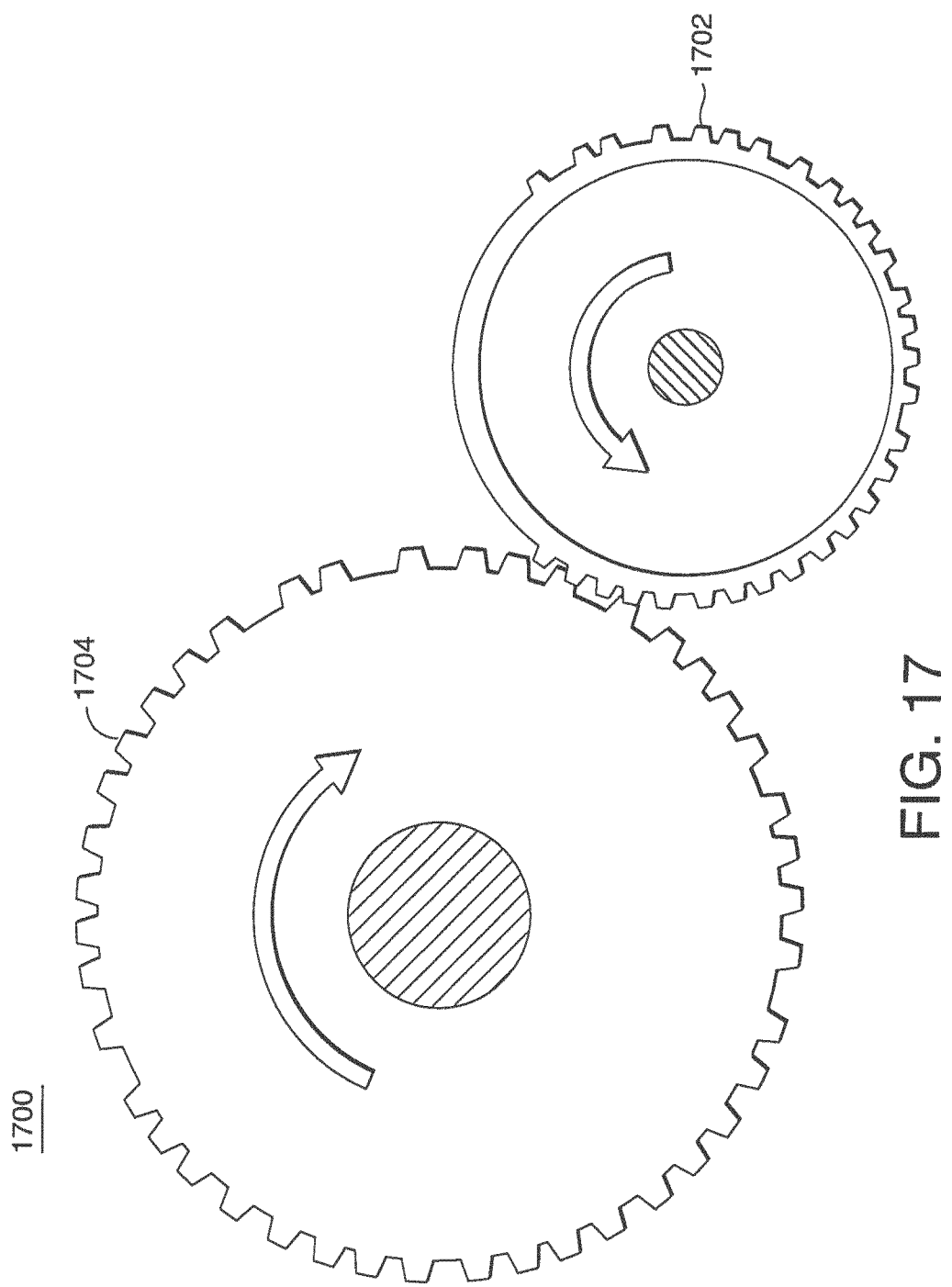
FIG. 17 depicts apparatus and corresponding motion as used for forming an externally patterned drum with a minimal seam, in accordance with a further embodiment of the present disclosure.

Embodiments according to the present disclosure can function or be utilized to form a near-seamless pattern on the outer (or inner) surface of a cylindrical by the transfer of a complementary pattern (by any of the replicating/imprinting methods known to the art, such as thermal embossing, etc.) from a patterned cylinder of larger diameter (e.g., as shown for FIG. 17 described in further detail infra).

For patterning an external drum, the imprinting (transferring) "cylinder" can also be a sheet whose length is greater than the circumference of the support drum. Having a smaller circumference, the smaller drum will complete one revolution before the larger imprinting drum, and the imprinting drum is withdrawn as the smaller drum completes its single revolution.

Supporting Cylinder Tool

The cylindrical tools made by any of the methods of this disclosure can be mounted in a roll processing machine either directly (with no additional support) or with the use of an inner support member, for example, as described in one or more of the applications referenced in the Related Applications section, supra. Plated metal drums (e.g., Ni electroforms, etc.), typically 0.008-0.012 inches (8-12 mils) thick, being fairly strong, can be mounted directly, which offers the benefit of potentially quick machine insertion and removal. Metal drums and polymer tools can also be attached to an inner sleeve for additional support.

Figure 16A:
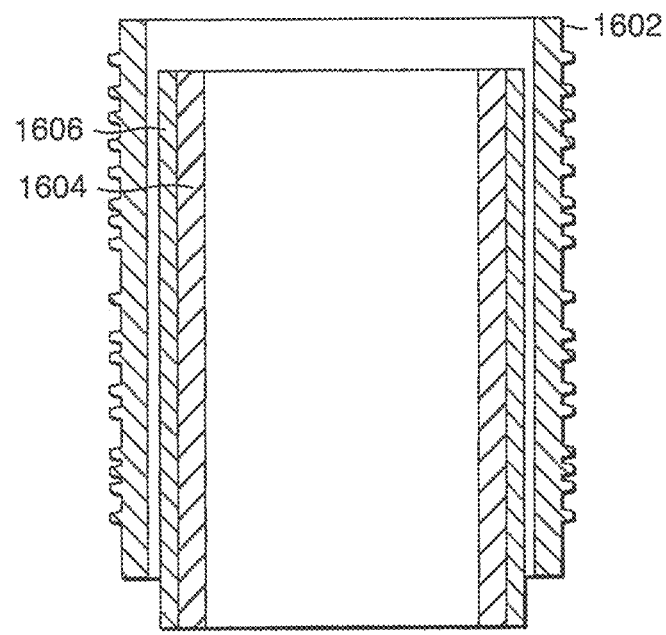
FIG. 16A depicts a schematic of process for separating an inner drum tool from an outer "mold" inside which the inner tool can be formed.

Embodiments of the present disclosure (1600A) can function to form an improved mounting support for cylindrical tools by using a metal (or glass, ceramic, fiber or polymer) inner sleeve 1604 whose outer surface is coated by an elastomeric (compression) layer 1606 (as shown FIG. 16A). FIG. 16A depicts a schematic of process for separating an inner drum tool from an outer "mold" 1602 inside which the inner tool can be formed. Inner part is cooled by circulation of chilled fluid (or other cooling technique) while outer part is heated. Differential thermal expansion/contraction allows the inner part to be withdrawn from the outer part without damage.

The outer diameter of this element 1606 is slightly larger than the inner diameter of the drum pattern tool 1602, such that the simultaneous heating of the tool and/or cooling of the elastomer-coated sleeve will allow the cylindrical tool to fit over the sleeve, and be removed or attached to the sleeve as desired based on the controlled differential movement between the two parts.

In embodiments similar to that of FIG. 16A, upon return to room temperature, an interference fit is formed, which can allow securing/fixing of the tool 1602 to the sleeve (1604 surrounded by layer 1606). The elastomeric layer 1606 can be used to impart some flexibility to the drum tool, which is useful in pattern replication. The amount of flexibility can be broadly controlled by the durometer and thickness of the elastomeric layer. The compression layer can also useful in compensating for step-height differences resulting from part thickness variations, as discussed above. In cases in which inner support elements (internal strips, et.) are used in joining the pattern elements, grooves may be cut into the elastomer or sleeve to accommodate the support strip.

Figure 16B:
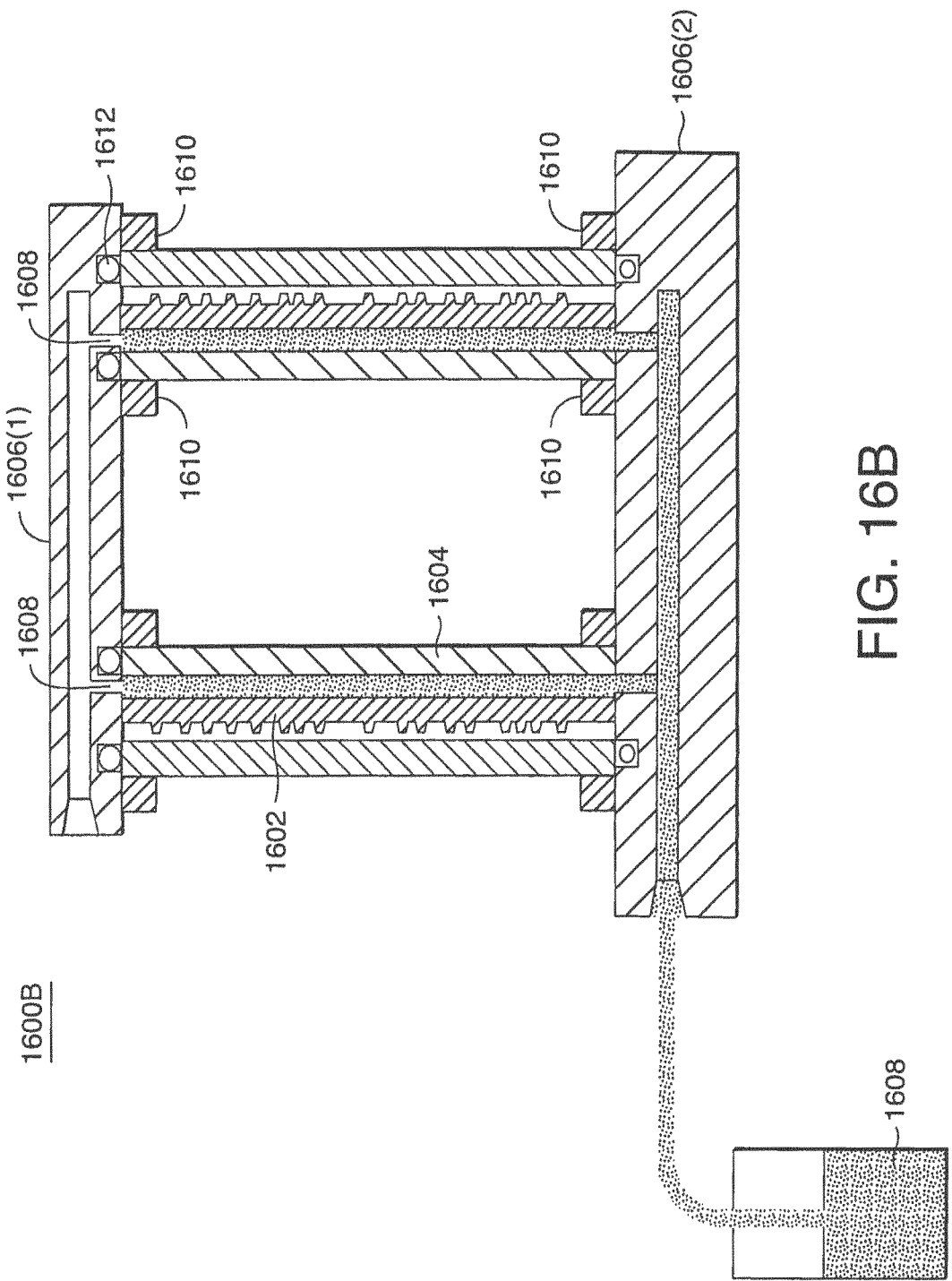
FIG. 16B depicts a technique for attaching cylindrical pattern to support ("sleeve") in accordance with an embodiment of the present disclosure.

FIG. 16B illustrated another technique 1600B for attaching a cylindrical tool 1602 to an inner support (sleeve) 1604. FIG. 16B depicts a technique for attaching cylindrical pattern to support ("sleeve") in accordance with an embodiment of the present disclosure. The externally patterned cylinder 1602 (e.g., #4 in FIG. 1b) may be left in the fixture in which it was formed and mounted in the centralizing fixture 1606(1)-1606(2). An inner (support) sleeve is precisely located (by means of dowel pins or other fixtures 1610) so that it is concentric to the outer fixture, and a top seal 1612 is put in place. By means of vacuum, a sealing adhesive 1608 (epoxy, silicone, low melting "Wood' s" metal, etc.) is drawn into the space between the inner support sleeve 1604 and the inner surface of the patterned cylinder 1602. After curing, the outer shell is disassembled and the pattern tool can be bonded to the support sleeve, which can be released for mounting into a roll embossing machine.

In FIG. 16B, the externally patterned cylinder 1602 (e.g., similar to #4 in FIG. 1B) is left in the fixture in which it was formed and the complete assembly mounted in the centralizing fixture. The inner support sleeve 1604 is precisely located (by means of dowel pins or other 1610) such that it is concentric with the inner surface (tool) of the outer fixture, and a top seal is put in place. By means of vacuum, a sealing material (epoxy, silicone, low melting "Wood's" metal, etc.) is drawn into the space between the inner support sleeve and the inner surface of the patterned cylinder.

Embodiments similar to that of FIG. 16B can be useful to eliminate/minimize air bubbles or pockets that could compromise the integrity of the bond. After curing, the outer shell is disassembled and the bonded pattern tool released. It should be noted that an advantage of the gap filling with low melting point liquid metal is that it offers the ability of re-melting (and reuse) of the metal in order to separate the drum tool from the inner sleeve.

A further advantage of such an approach shown in FIG. 16B is that during the bonding process, the pattern tool surface is protected by the outer fixture in which it was formed and is not directly handled until the tool is mounted on its inner support and released from the outer fixture.

Mounting Patterning Tool in Machine

For use in roll-to-roll embossing/imprinting equipment, the patterning cylinder may be mounted (with or without inner support member, depending on the mounting technique) by any of several means known to the art, including by tension mounting (expansion arbor or air-bladder), mechanical fastening (end-bells or inner core chuck), elastomeric compression arbor, adhesive bonding, soldering, welding, magnetic clamping, etc. FIGS. 16A-16B depicts exemplary embodiments, as described previously.

Tool Performance Enhancements

It is a method of this disclosure to improve the embossing performance and durability of patterning tools described herein by the addition of certain overcoats and treatments.

To improve embossing performance and minimize tool clogging and contamination, release layers such as silicones, fluorocarbons and other low-surface energy materials may be applied to the surface of the tool. Certain metals, including chrome and gold, can be applied to the tool surface by vacuum deposition or electro/electroless plating to impart improved release characteristics to the tool. For metal tools (particularly Ni), Ni and PTFE can be co-deposited to form a very effective release coating. Chemical and physical treatments, including passivation and surface conversion (in which a relatively thin layer is formed on the tool surface, such as an oxide or dichromate) are known to improve tool release characteristics.

Embodiments of the present disclosure can function to increase the durability and/or damage resistance of patterning took in order to improve their longevity in manufacturing environments. For polymeric and photoresist tools (and intermediate patterns), post-exposure processing, such as cross-linking by e-beam, UV, thermal, chemical means, can increase hardness and chemical resistance, including solvent resistance.

The durability of metal tools made by electroplating, electroless deposition, chemical vapor deposition, etc. can be increased by metallurgical means such as annealing or by the use of additives in the deposition process. For example, it is well known that the hardness of electroformed Ni may be increased by the addition of small amounts of phosphorus, manganese, vanadium, etc. to the plating solutions.

FIG. 17 depicts apparatus 1700 and corresponding motion as used for forming an externally patterned drum 1702 with a minimal seam, in accordance with a further embodiment of the present disclosure. Larger diameter drum 1704 (which may have large seam) having complementary pattern to that of desired tool is pressed into outer surface of deformable (polymer, etc.) surface of smaller diameter drum 1702. The drums are separated after completion of one revolution of small drum. Post processing is used to further harden the drum tool.

Cylindrical Tool Replication/Replication Tree

Thus as described herein, embodiments of the present disclosure can function to enable the production of multiple copies of a cylindrical tool made from an original pattern. This offers a number of advantages in the manufacturing of material using such patterning tools, including reduced costs (replicas being substantially less expensive than originals) and faster tool production (e.g., replica tools in accordance with the present disclosure) thus requiring less time to create than originals.

The flow diagram by which multiple replica patterning cylinders can be produced, whether using seamed or seamless tool elements, is given in FIG. 1B. The "family tree" propagation process can start with either an external ("negative") pattern (#1) or an internal ("positive") pattern (#3), where 'positive' arbitrarily refers to the relief pattern of the tool being that required to form the finished "product" (embossing), and "negative" being the opposite. The internal pattern (#3) can be formed by the shell fixture methods described above (e,g., for FIGS. 11, 13, and 15), or can be formed as a result of replication of the external drum (#1). From this point it is irrelevant whether the starting point was an external or internal pattern.

While certain embodiments have been described herein, it will be understood by one skilled in the art that the methods, systems, and apparatus of the present disclosure may be embodied in other specific forms without departing from the spirit thereof. The embodiments described herein are accordingly to be considered in all respects as illustrative of the present disclosure and not restrictive.

What is claimed is:

1. A method of forming a replication tool having a continuous three-dimensional relief pattern, the method comprising:
   with an adjustable fixture, securing each of two or more pattern parts so that the pattern parts abut one another along portions of their respective perimeters to form a cylindrical mold having a closed surface, each pattern part having a three-dimensional relief pattern on one surface and a registration mark for determining the position of the pattern of the pattern part;
   using the registration marks, registering each of the two or more pattern parts with respect to one another such that the respective three-dimensional relief patterns of the abutted pattern parts form a continuous pattern, wherein the continuous pattern is without interruption on the closed surface; and
   forming a replication tool by applying a moldable material to the closed surface, wherein molding the replication tool includes forming a desired pattern that is a continuous copy complementary to that of the continuous pattern of the abutted pattern parts.

2. The method of claim 1 comprising pattern formation by radiation, thermal, chemical or other embossing techniques.

3. The method of claim 1, wherein using registration marks comprises detecting alignment patterns on adjacent pattern parts by use of optical or electronic sensors to effect registration of parts.

4. The method of claim 1, wherein using registration marks comprises adjusting adjacent pattern parts by using a precision linear translation device.

5. The method of claim 4 wherein using the precision linear translation device includes adjusting a micrometer or piezoelectric translator.

6. The method of claim 1 further comprising using pattern parts with different patterns to form replication tool.

7. The method of claim 6, further comprising:
   imprinting an outer surface of the replication tool using a patterning tool having a diameter larger than that of the cylinder; and
   with the patterning tool, forming a seamless patterned cylinder for use as a cylindrical patterning tool.

8. The method of claim 7 wherein imprinting an outer surface includes using radiation, thermal, chemical, or other embossing techniques.

9. The method of claim 7 further including using an expansion arbor to secure the patterned cylinder to a drum tool.

10. The method of claim 9 wherein the expansion arbor comprises an air bladder or element.

11. The method of claim 9 further comprising using a compliant layer on an inner support sleeve to secure the cylindrical patterning tool.

12. The method of claim 11 comprising shrink-fitting the cylinder over a sleeve using thermal expansion of the cylinder or thermal contraction of the sleeve or both thermal expansion of the cylinder or thermal contraction of the sleeve.

13. The method of claim 11 further comprising using a compliant layer on an inner support sleeve to reduce distortion of the continuous pattern surface by inside seam steps.

14. The method of claim 12 wherein using the compliant layer includes using an elastomeric layer.

15. The method of claim 13 further comprising using a machine groove in an inner support to accommodate steps or inside support strips.

16. The method of claim 1 further comprising attaching the replication tool to an inner support sleeve using a gap-filling material.

17. The method of claim 16 wherein using the gap-filling material comprises using a concentric inner sleeve.

18. The method of claim 16 further comprising using a vacuum to draw in the gap-filling material.

19. The method of claim 16 comprising using an epoxy, silicone, or low-melting metal as the gap-filling material.

20. The method of claim 7 further comprising treating the cylindrical patterning tool for improved release performance.

21. The method of claim 20 wherein treating the cylindrical patterning tool comprises using a fluorpolymer coating.

22. The method of claim 20 wherein treating the tool comprises using a low surface energy material.

23. The method of claim 20 wherein treating the tool comprises using a vacuum, CVD, or plated metal for release.

24. The method of claim 23 wherein the plated metal comprises chrome, gold, silver, copper, or nickel.

25. The method of claim 20 wherein treating the cylindrical patterning tool comprises applying a chemical treatment to the tool.

26. The method of claim 25 wherein applying a chemical treatment comprises applying a chemical for passivation.

27. The method of claim 7 further comprising treating the cylindrical patterning tool for improved durability.

28. The method of claim 27 wherein treating the cylindrical patterning tool for improved durability comprises forming a radiation-cured hard coat.

29. The method of claim 28 wherein forming the radiation-cured hard coat comprises applying an e-beam or UV-beam.

30. The method of claim 28 wherein forming the radiation-cured hard coat comprises forming cross linking in a polymer.

31. The method of claim 28 further comprising applying one or more deposition hardeners for electroless or electroplated metals.

32. The method of claim 31 wherein the one or more deposition hardeners include one or more of phosphorus, manganese, or vanadium.

* * * * *